(12) United States Patent
Yoshizawa

(10) Patent No.: US 6,749,926 B1
(45) Date of Patent: Jun. 15, 2004

(54) CURVED GLASS SHEET FOR VEHICLE WINDOW

(75) Inventor: Hideo Yoshizawa, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 0 days.

(21) Appl. No.: 10/031,958

(22) PCT Filed: Jun. 2, 2000

(86) PCT No.: PCT/JP00/03626

§ 371 (c)(1),
(2), (4) Date: May 7, 2002

(87) PCT Pub. No.: WO01/07373

PCT Pub. Date: Feb. 1, 2001

(30) Foreign Application Priority Data

Jul. 23, 1999 (JP) ............................................. 11/209933

(51) Int. Cl.[7] .............................. B32B 1/00; C03B 22/00
(52) U.S. Cl. ........................ 428/174; 428/212; 65/102
(58) Field of Search .................................. 428/174, 212, 428/426; 65/102

(56) References Cited

U.S. PATENT DOCUMENTS

| | | |
|---|---|---|
| 3,545,951 A | 12/1970 | Nedelec et al. |
| 3,832,153 A | 8/1974 | Bezombes et al. |
| 4,069,617 A | 1/1978 | Koike |
| 4,123,246 A | 10/1978 | Johnson |
| 4,139,359 A | 2/1979 | Johnson et al. |
| 4,292,065 A | 9/1981 | Nedelec et al. |
| 4,318,728 A | 3/1982 | Claassen |
| 4,540,426 A | 9/1985 | Bocelli et al. |
| 4,615,931 A * | 10/1986 | Matsuyoshi et al. ........ 428/174 |
| 4,666,496 A | 5/1987 | Fecik et al. |
| 4,820,327 A | 4/1989 | Letemps et al. |
| 4,863,419 A | 9/1989 | Sansone |
| 4,899,872 A | 2/1990 | Hokao |
| 4,904,294 A | 2/1990 | Schultz et al. |
| 4,957,528 A | 9/1990 | Letemps |
| 4,969,966 A * | 11/1990 | Norman ..................... 428/174 |
| 4,983,205 A | 1/1991 | Kuster et al. |
| 5,022,907 A | 6/1991 | Vanaschen et al. |
| 5,069,705 A | 12/1991 | Letemps et al. |
| 5,264,058 A | 11/1993 | Hoagland et al. |
| 5,286,542 A | 2/1994 | Susi et al. |
| 5,443,669 A | 8/1995 | Tünker |
| 5,946,860 A | 9/1999 | Weber et al. |
| 6,279,347 B1 | 8/2001 | Yoshizawa |

FOREIGN PATENT DOCUMENTS

| | | |
|---|---|---|
| DE | 37 12 162 | 1/1988 |
| DE | 39 08 644 C1 | 3/1989 |
| DE | 39 28 968 C1 | 9/1989 |
| DE | 41 04 086 C1 | 2/1991 |
| EP | 0 346 197 | 12/1989 |
| EP | 0 477 913 A2 | 4/1992 |
| EP | 0 133 144 B1 | 2/1995 |
| FR | 2137143 | 12/1972 |
| GB | 1103192 | 3/1965 |
| GB | 1112781 | 5/1965 |
| JP | 44-14832 B | 7/1969 |
| JP | 49-10331 B | 3/1974 |
| JP | 51-141123 | 12/1976 |
| JP | 54-85217 | 7/1979 |
| JP | 55-75930 A | 6/1980 |

(List continued on next page.)

Primary Examiner—Donald J. Loney
(74) Attorney, Agent, or Firm—Merchant & Gould P.C.

(57) ABSTRACT

Glass sheet, accurately curved in two directions and having a compound curved surface, provides a non-cylindrical, non-spherical, smooth, continuous reflection image. When it is used as a door window pane, a smooth opening/closing by a simple mechanism is ensured, and a high degree of freedom in a moving direction is provided. This shape, although unable to be accurately formed by a conventional press molding method, can be achieved by a glass sheet bending method using a heat-resisting belt.

9 Claims, 33 Drawing Sheets

FOREIGN PATENT DOCUMENTS

| | | |
|---|---|---|
| JP | 55-42231 B | 10/1980 |
| JP | 64-48315 | 9/1987 |
| JP | 2-221133 | 9/1990 |
| JP | 3-50132 | 3/1991 |
| JP | 3-174334 | 7/1991 |
| JP | 5-9037 A | 1/1993 |
| JP | 6-40732 | 2/1994 |
| JP | 7-237928 | 9/1995 |
| JP | 10-203840 A | 8/1998 |
| JP | 11-500796 | 1/1999 |
| JP | 11-147728 A | 6/1999 |
| WO | 99-24373 | 5/1999 |

* cited by examiner

Cross section A-A

Cross section B-B

Cross section C-C

# CURVED GLASS SHEET FOR VEHICLE WINDOW

FIELD OF THE INVENTION

The present invention relates to a bent glass sheet suitably used for a vehicle window, especially for a vehicle window having a mechanism to move the windowpane along the surface direction.

BACKGROUND OF THE INVENTION

Typical windows for front doors of automobiles are opened and closed by moving the windowpanes along the surface direction of the vehicle bodies. In such a case, windowpanes are shaped in general to be flat or cylindrical. A cylindrical glass sheet slides along a direction with a predetermined curvature radius and reciprocates between the inside of the door and the opening.

Recently, glass sheets bent both in the sliding direction and in the longitudinal direction of the vehicle are required to improve consistency with the vehicle's design. Such a bent glass sheet is often called a glass sheet having a "complex curved" surface or a "two directional" bent glass sheet.

A surface of such a bent glass sheet is required to be bent with high accuracy along a predetermined curved surface. When the surface has a point at which the curvature varies, reflected images on the glass surface will be distorted in the vicinity of the point. Especially, such a distortion of reflected images should be removed from windowpanes composing a sideline of an automobile.

A bent glass for a rear window or the like of such an automobile is not bent to have a constant curvature. Therefore, even if some regions of the bent glass sheet have curvatures different from a predetermined curvature, the influence is difficult to identify visually. On the other hand, since a glass sheet that is bent in two directions to have identical curvatures will provide extremely natural reflected images as a whole, even partial changes in the curvature and defects on the surface will be conspicuous.

When the glass sheet is used for a door window, preferably the windowpane slides while it is maintained at a certain position as much as possible in an opening (slit) formed at the upper end of the door housing. A wider slit for a margin may permit rainwater or dust to enter the door housing easily. Weatherstrips are provided for the slit in order to prevent passage of foreign objects. However, if the windowpane is leaned excessively in one direction, friction between the weatherstrips and the windowpane becomes unduly large, or a space is created between these them.

Because of these conditions, if a glass sheet for a vehicle window is bent in two directions, it should be processed with higher accuracy when compared to a bent glass sheet with a further complicated shape.

Various methods to bend glass sheets have been proposed. Surprisingly however, two-directional bent glass sheets with accuracy to respond to the demands of the market have not been manufactured, even though such glass sheets are required from a design viewpoint. This results from the limited accuracy in the conventional bending methods.

A typical method to bend a glass sheet is press molding. This method is suitable for mass-production of bent glass sheets with a complicated shape that are used for rear windows or the like of automobiles. However, in a glass sheet 503 that is pressed while being supported with a ring mold 501 and being attracted by a mold 502, a central portion 504 hangs down slightly (FIG. 33B) before it is cooled. If the degree of deformation caused by gravity could be expected, the shape of the mold might be adjusted finely. However, since there are various factors determining the deformation, precise expectation of the deformation degree is substantially impossible. Similarly, in press-molding using tongs, the deformation degree is difficult to expect. In another method, a mold is arranged entirely along both surfaces of a glass sheet to be bent before cooling the bent glass sheet while keeping the glass sheet along the mold. This method also might be available. However, since a great internal stress remains in the glass sheet, the bent glass sheet may be deformed when it is released from the mold. In conclusion, problems should be solved to manufacture with accuracy a glass sheet that is bent in two directions by press-molding.

U.S. Pat. No. 4,123,246 and JP-A-3-174334 propose a method to heat glass sheets while conveying them by rollers in order to bend the glass sheets along the rollers. However, the glass sheets will be bent intermittently if they are bent by using rollers arranged above and below the conveying passage. More specifically, the glass sheets will be bent and folded in part while they are bridged between pairs of rollers, especially in initial stages of the bending process. When the glass sheet is bent also in a direction perpendicular to the conveying direction, the rollers should be bent before being arranged. It is difficult to bend the respective rollers arranged along the conveying direction with high accuracy and rotating the rollers in that state. Bending glass sheets by sandwiching them with rollers is excellent in view of mass production but it cannot provide sufficient processing accuracy.

JP-A-5-9037 proposes a method of conveying glass sheets while supporting the same sheets with a gas spouting upwards from a hearth bed arranged below. The gas heats the glass sheet at the same time, and the sheet sags down along the hearth bed. In this manner, defects due to roller "bending/folding" or due to contact with rollers can be prevented. However, the passage to convey glass sheets should be inclined to bend the glass sheet in two directions and thus, conveying glass sheets while keeping a stable orientation is difficult. When the glass sheet cannot be oriented stably, accuracy in forming the glass sheet also will deteriorate. The method of conveying and bending glass sheets by spouting a gas is suitable for providing a simpler form, but the process accuracy is sacrificed when a glass sheet is bent in two directions.

As mentioned above, it has not been considered in any conventional bending methods that a glass sheet is cooled (quenched or annealed) after a bending process while keeping the bent shape accurately, nor have any ideas relating to such methods been disclosed.

Because of the above-mentioned reasons, no methods to produce glass sheets bent in two directions with accuracy have been established. In the above references, manufacturing of glass sheets bent in two directions is attempted. The glass sheets according to the references may be bent in two directions as a whole, but some regions thereof are not bent as desired when observed in detail, because of limitations resulting from the methods themselves. As a result, bent glass sheets arranged in the sides of an automobile such as a door glass are shaped in a simple manner actually.

JP-A-11-500796 proposes to use door glass made of a glass sheet that is bent to have a more complicated shape than a glass sheet bent in two directions. This reference discloses a mechanism to lift a bent glass sheet of an imaginary barrel-shaped sleeve surface along the longitudinal direction of the vehicle. This mechanism allows a glass sheet of a barrel-shaped sleeve surface to lift while swiveling to maintain the lower side of the glass sheet in parallel. In such a bent glass sheet with complicated shape, distortion of reflected images would be less distinguishable.

However, a complicated lifting mechanism should be provided to a space formed inside the door (door housing) in order to lift the glass sheet. Such a complicated mechanism will cause troubles and raise costs. For swivel-lifting a glass sheet of a barrel-shaped sleeve surface, a guide rail that is bent three-dimensionally so as to describe a spiral is needed. If the guide rail has complicated curved lines, a wire is also bent at a point, and the durability of the wire can be negatively affected due to friction with the guide rail. In some cases, changing tension of the wire hinders smooth operation. Positions of the glass sheet at the door slit will also vary considerably.

For the above-mentioned reasons, the market's needs for glass sheets that are bent accurately in two-directions are further increasing in spite of difficulties in production thereof.

SUMMARY OF THE INVENTION

The inventor started to improve the bending process. To bend a glass sheet accurately to provide a desired shape, preferably the entire surface of at least one side of a glass sheet is supported in bending the glass sheet. A mold (bending member) should be prepared for this purpose. However, the glass sheet will be deformed as mentioned above if it is lifted with a member such as a ring mold, or if the glass sheet is hung with tongs in pressing the glass sheet against the mold.

After keen examinations, the inventor successfully processed and bent a glass sheet with accuracy by pressing the glass sheet together with a heat-resistant belt against a mold, and prevented the glass sheet from being deformed even in a step of cooling thereof. The bent glass sheet of the present invention is not limited to what is bent with a belt, but such a bent glass sheet became feasible for the first time by using a belt well-fitting to the surface of the glass sheet and also by adapting the shape of the conveying passage to the shape of the bent glass sheet in a cooling step.

A bent glass sheet for a vehicle window according to the present invention is obtained by bending a flat glass sheet that is heated to a temperature between a strain point and a softening point of the glass sheet, and formed as follows. The bent glass sheet has a substantially uniform thickness and the main surfaces are curved surfaces. All points on the curved surface have a maximum curvature in the direction of one of the two tangent vectors (a first tangent vector) that are contacting the curved surface and crossing each other perpendicularly, while the same curved surface has a minimum curvature in the direction of the other tangent vector (a second tangent vector).

A bent glass sheet for a vehicle window according to the present invention is formed as follows.

A bent glass sheet according to the present invention has a substantially uniform thickness and the main surfaces are curved surfaces. All points on the curved surface have a maximum curvature in the direction of one of the two tangent vectors (a first tangent vector) that are contacting the curved surface and crossing each other perpendicularly, while the same curved surface has a minimum curvature in the direction of the other tangent vector (a second tangent vector).

The bent glass sheet according to the present invention is further characterized in that all the points have the substantially same maximum curvature. Moreover, this maximum curvature is substantially equal to a curvature at every point on a curved line formed by crossing this curved surface and a flat plane comprising a normal vector at one point on the curved surface and a tangent vector providing the maximum curvature at the one point. The minimum curvature is neither 0 (i.e., the glass sheet is not cylindrical) nor equal to the maximum curvature (i.e., the glass sheet is not spherical). Preferably, the curvature radius of the curved line is no less than 500 mm but less than 5000 mm.

In this specification, the term "main surfaces" indicates a front/back surface pair of a glass sheet without the edge surface. The edge surface of the glass sheet includes a processed surface (polished surface) formed by grinding the edge of the glass sheet (i.e., the main surface does not include a polished surface).

Preferably in the bent glass sheet according to the present invention, the minimum curvature is substantially equal to a curvature at every point on a curved line formed by crossing this curved surface and a flat plane comprising a normal vector at one point on the curved surface and a tangent vector providing the minimum curvature at the one point. Preferably the curvature radius of the curved line is from 5000 mm to 50000 mm.

It is further preferable that the bent glass sheet according to the present invention is a tempered glass sheet toughened by heating and then quenching the glass sheet.

Thickness of the bent glass sheet is not specifically limited but preferably, it is from 2.3 mm to 5.0 mm.

BRIEF DESCRIPTION OF THE DRAWINGS

FIGS. 33A and 33B are explanatory views to illustrate deformation of a glass sheet manufactured according to a conventional bending method, in which FIG. 33A shows the glass sheet during a molding step and FIG. 33B shows the glass sheet after the molding.

DETAILED DESCRIPTION OF THE INVENTION

Preferable embodiments of the present invention are described below referring to drawings.

Figure 1:
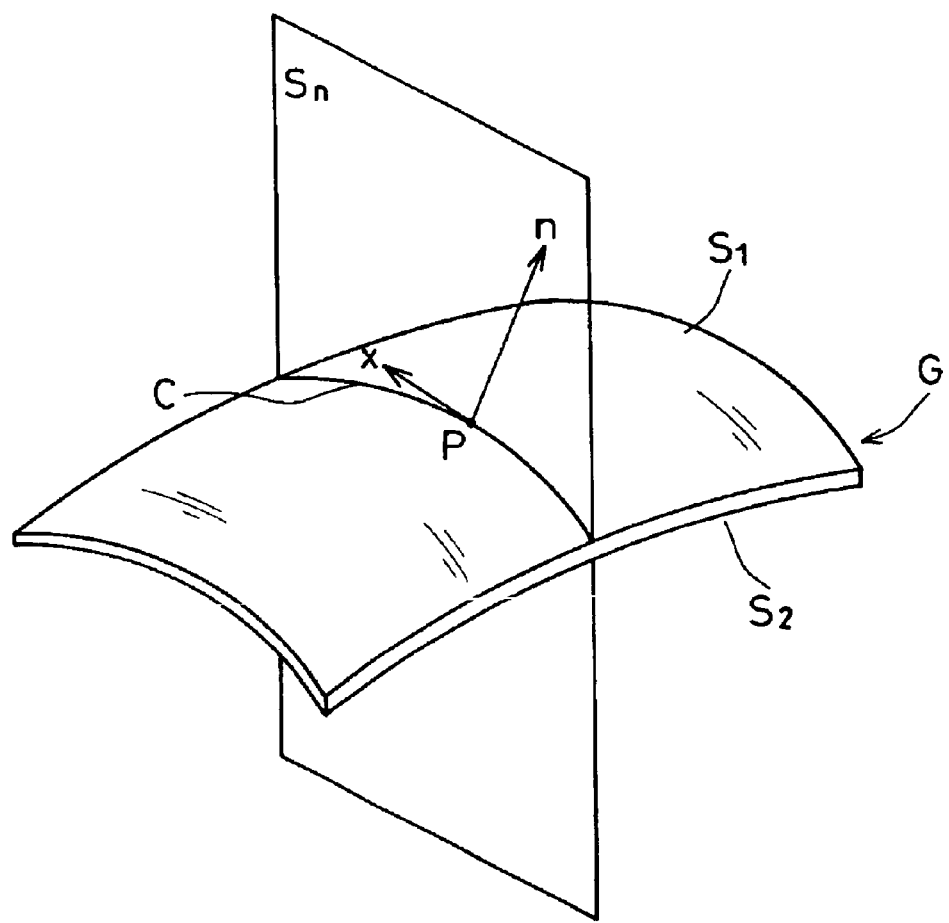
FIG. 1 is an explanatory view of an embodiment of a bent glass sheet according to the present invention.

First, the relationship between the respective vectors and the curvatures is described by referring to FIG. 1. FIG. 1 shows a bent glass sheet G of an embodiment in the present invention. The glass sheet G comprises main surfaces $S_1$ and $S_2$ that are parallel to each other. When a flat plane $S_n$ comprises a unit normal vector n and a unit tangent vector x at a point P on the main surface $S_1$, the main surface $S_1$ taken along this flat surface $S_n$ shows a curved line c. The curvature at the point P in the curved line c is referred to as k. In this case, a unit tangent vector $x_1$ in which the curvature k becomes the maximum value $k_1$ and a unit tangent vector $x_2$ in which the curvature becomes the minimum value $k_2$ cross perpendicularly (Euler's theorem: when an angle made by x and $x_1$ is $\theta$, $k = k_1 \cos^2 \theta + k_2 \sin^2 \theta$). The curvatures $k_1$ and $k_2$ correspond to main curvatures and the unit tangent vectors $x_1$ and $x_2$ correspond to the main curvature direction.

When a unit tangent vector $x_1$ with a maximum curvature and a unit tangent vector $x_2$ with a minimum curvature exist at a point P on a curved surface and these vectors cross each other perpendicularly, this curved surface can be differentiated mathematically at the point P. Also, such a curved surface is continuous and smooth.

The glass sheet G is bent so that a constant maximum curvature $k_1$ is obtained without regard to the position of the point P on the main surface $S_1$. When the unit tangent vector x is the unit tangent vector $x_1$, curvatures at all points on the curved line c coincide with the maximum curvature. On the main surface $S_1$, the unit tangent vector $x_1$ direction is constant without regard to the position of the point P.

When the bent glass sheet G is moved along the curved line c, the main surfaces $S_1$ and $S_2$ slide along the in-plane direction. The bent glass sheet G can be slid, for example, along a guide rail arranged to follow the curved line c for opening/closing the window.

On the main surface $S_1$, the minimum curvature does not become 0 without regard to the position of the point P; the glass sheet G is bent in two directions at every point. Therefore, the glass sheet G is neither a cylinder nor a curved surface on a ring similar to a doughnut. The minimum curvature is not equal to the maximum curvature without regard to the position of the point P. In other words, the main surface $S_1$ does not have a point at which curvatures in all directions are identical, i.e. an umbilicus, so the surface is not spherical or ellipsoidal.

The above explanation is about the shape of a bent glass sheet according to the present invention. This bent glass sheet is characterized also in that it is bent with accuracy. The accuracy of the bent shape can be examined, for example, by using a wooden mold shown in FIG. 2.

This wooden mold is manufactured as an examining table for a bent glass sheet in which the minimum curvature $k_2$ also coincides without regard to the position of the point P. The wooden mold was prepared by using an NC router to have a surface meeting the above-mentioned requirements. The curved line has the predetermined curvature at every point in a trace on the surface along the longitudinal direction 44 or along the short direction 45.

More specifically, in a wooden mold prepared for this purpose, the curvature radius of a curved line in the longitudinal direction 44 was 15000 mm and a curvature radius of a curved line in the short direction 45 was 1300 mm. A tempered bent glass sheet of about 900 mm×about 500 mm was manufactured to have the above mentioned curvature radii by a press-molding method using a ring mold. When this tempered bent glass sheet is mounted on the wooden mold, the central portion of the main surface was separated from the wooden mold up to about 3 mm while the peripheral portion fitted with the surface of the wooden mold.

A tempered bent glass sheet was prepared to have the above-mentioned curvature radii using a belt in a method mentioned later. When this glass sheet was mounted on the wooden mold, the entire main surface of the bent glass sheet is brought in absolute contact with the surface of the wooden mold.

A glass sheet manufactured in a following method using a belt can maintain extremely high forming accuracy, even if a glass sheet sized as above-mentioned for a use as a windowpane of an automobile is bent. In a bent glass sheet formed according to the method, a clearance between the main surface and a desired curved surface (a surface of a wooden mold) was too small to be measured, or a measured clearance was not more than 1.5 mm. The present invention includes a bent glass sheet having a clearance of 1.5 mm or less, preferably 1.0 mm or less between a surface of the glass sheet and a desired curved surface. Such a glass sheet has a main surface that substantially fits to a desired curved surface.

Such a wooden mold having a surface ground to be a predetermined form will facilitate examination of processing accuracy of bent glass sheets. In order to accurately measure such a clearance, for example, a plurality of dial gauges can be arranged along a direction crossing perpendicularly the direction of the maximum curvature on the surface of the wooden mold. And a bent glass sheet is slid on this wooden mold in the maximum curvature direction so as to measure clearances on the whole region of the surface of the bent glass sheet.

When the bent glass sheet was mounted on the wooden mold and moved to slide both the surfaces, the bent glass sheet translated in all straight directions including the longitudinal direction 44, the short direction 45 and also any directions including an oblique direction 46 while keeping its main surface travelling along the surface 43 i.e., without being separated from the surface 43). Even when the glass sheet was moved in plural directions as a result of a combination of parallel translations (such as L-shape or V-shape), the main surface of the glass sheet kept a contact with the surface of the wooden mold. However, when the glass sheet was rotated at a position, the main surface was separated from the surface 43 of the wooden mold. A curved line having a curvature radius bigger than 1300 mm but smaller than 15000 mm was obtained by tracing the surface 43 of the wooden mold in the oblique line 46.

The bent glass sheet was moved successfully in an arbitrary direction along the main surface while keeping the main surface in a curved surface including thereof.

Therefore, the bent glass sheet can be lifted in an automobile's door in an arbitrary direction corresponding to some factors such as the shape of the windowpane. In this case, a simple guide rail curved within a predetermined flat plane can be provided to a door housing of an automobile without regard to the lifting direction. The arbitrary selection in the lifting direction is possible from a mathematical viewpoint, but it has never been applied to windowpanes.

A bent glass sheet according to the present invention has a main surface that is substantially continuous and smooth. Moreover, the glass sheet is bent in at least one direction with a constant curvature, and thus, it can provide excellent reflected images.

This bent glass sheet according to the present invention is further explained below from another point of view.

As mentioned above, this bent glass sheet moves in an arbitrary direction in a simple manner in order to serve to open/close a window. From this viewpoint, a bent glass sheet according to the present invention also can be explained as follows. A bent glass sheet according to the present invention is substantially uniform in thickness and it has a main surface as a curved surface, and the main surface is a part of a curved surface formed by a parallel translation of a first curved line, which is present in a predetermined flat plane and convex in one direction, in a direction outwards from the flat plane. In the parallel translation, the first curved line is moved so that loci of all points composing this curved line become a group of second curved lines having a predetermined curvature radius, being substantially parallel to each other and equal in length.

In this specification, "a curved line that is convex in one direction" is interpreted as a curved line having no point of inflection (a point on a curved line that marks the place where two separate arcs, one convex and one concave, are formed) thereon. "A parallel translation" is interpreted as a movement of a line in which the line is kept in parallel to the original line during and after the move.

When the bent glass sheet is moved between a door housing and the upper space of a vehicle, preferably a first curved line is determined so that the glass sheet is adjusted to the slit at the upper end of the door housing. More specifically, the first curved line can be determined substantially along the body line of the vehicle. A glass sheet having the first curved line formed along the slit can be lifted smoothly by moving along a second curved line.

In every step of lifting the bent glass sheet, the first curved line appears along the slit at the upper end of the door housing even in a simple mechanism. Therefore, the slit's width at the upper end is sufficient if it is the same level as either a cylindrical or flat glass sheet. Also, excessive friction between weatherstrips and a glass sheet, or an imperfect sealing of the slit by the weatherstrips can be prevented. Moreover, there is no undue limitation for the design of a windowpane for a vehicle unlike a case where a cylindrical or flat glass sheet is used.

Figure 3:
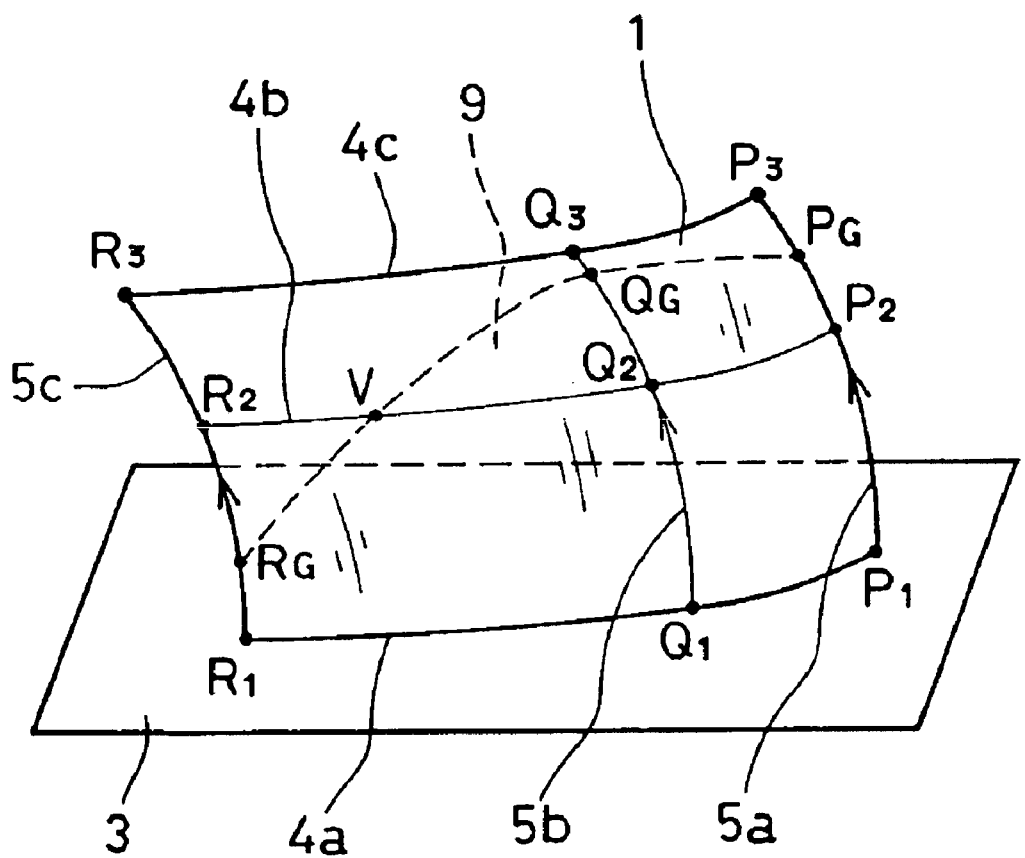
FIG. 3 is an explanatory view of a bent glass sheet, which is illustrated for further explanations.

As is shown in FIG. 3, a main surface 9 of the bent glass sheet can be obtained by cutting a predetermined curved surface 1. This curved surface 1 is regarded as a surface created by an arched curved line 4a existing in a flat surface 3 when the curved line 4a is moved in parallel on a predetermined definition. More specifically, points $P_1$, $Q_1$, and $R_1$ on the curved line 4a are moved over substantially the same distance, and loci 5a, 5b, and 5c of the points $P_1$, $Q_1$, and $R_1$ become arcs having substantially the same curvature radius and substantially the same shape. As a result, points $P_1$, $Q_1$, and $R_1$ reach points $P_3$, $Q_3$, and $R_3$ via points $P_2$, $Q_2$, and $R_2$, respectively. The curved line 4a rises from the flat surface 3 and reaches a curved line 4c via a curved line 4b. The curved lines 4a, 4b and 4c are substantially identical in shape and parallel to each other.

A part of the defined curved surface 1 is the main surface 9 of a bent glass sheet in the present invention. The bent glass sheet has another main surface of substantially the same shape as the main surface 9. The pair of main surfaces are positioned in parallel with a distance as the thickness of the glass sheet, wherein one is regarded as a convex surface and the other is a concave surface.

Curved glass sheets having such main surfaces are preferably used, for example, for door windows of automobiles. In FIG. 3, from which doors are omitted, the part below the flat surface 3 indicates a door housing, and the curved line 4a indicates a main surface of a glass sheet seen from the upper end of a door housing (slit) for clear explanation of the door's descent into the door housing. In other words, the bent glass sheet is housed inside the door by moving the respective points on the main surface 9 over the same distance along the loci 5a, 5b and 5c in the opposite direction (downward in FIG. 3). After this movement, the point $P_3$, for example, reaches $P_1$ via $P_2$, before proceeding below from the flat surface 3. Lifting of this bent glass sheet does not require adjustment of lifting ratio of the glass sheet or guide rails having a complicatedly bent shape, but any simple and reliable mechanisms for lifting flat or cylindrical windowpanes can be used. The slit is not necessarily in the flat surface.

As described above, the lifting direction of the windowpane is defined by the loci 5a, 5b and 5c. These loci are not limited to those of FIG. 3 as long as they are parallel to each other and have curvature radius suitable for lifting the glass sheet (preferably, 500 mm or more). Though there is no specific limitation, the upper limit of the curvature radius is preferably less than 5000 mm, for example. Though there is no specific limitation, the angle at which the flat surface 3 and flat surfaces comprising the respective loci 5a, 5b or 5c can be determined, for example, to be perpendicular. The angles can be defined according to the automobile design. Similarly, the shape of the curved line 4a can be defined to fit for the door of the automobile.

Figure 4:
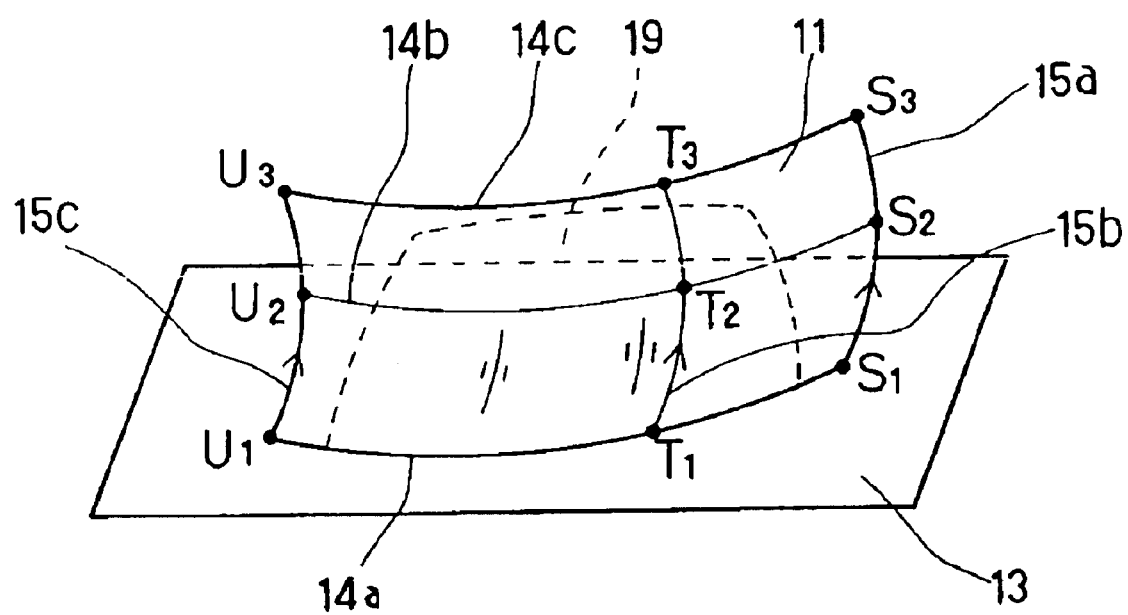
FIG. 4 is an explanatory view of another embodiment of a bent glass sheet according to the present invention.

FIG. 4 shows a bent glass sheet of another embodiment according to the present invention. A main surface 19 of the bent glass sheet can be obtained by cutting a predetermined curved surface 11. This main surface 19 is obtained, as in the above-mentioned manner, by moving a curved line 14a so that points $S_1$, $T_1$ and $U_1$ on this curved line are translated over the same distance and that loci 15a, 15b and 15c of the points $S_1$, $T_1$ and $U_1$ reaching $S_3$, $T_3$ and $U_3$ via $S_2$, $T_2$ and $U_2$ become arcs (second curved lines) having the substantially same curvature radius and same shape.

Though the curved lines 14a, 14b and 14c are parallel to each other, the curved lines are arcs having a predetermined curvature radius. The curvature radius of the curved lines 14a, 14b and 14c as arcs (first curved lines) is preferably larger than that of second curved lines. The preferable curvature radius of the second curved lines is no less than 500 mm but less than 5000 mm. The curvature radius of the first curved lines is preferred to range from 5000 mm to 50000 mm.

Figure 2:
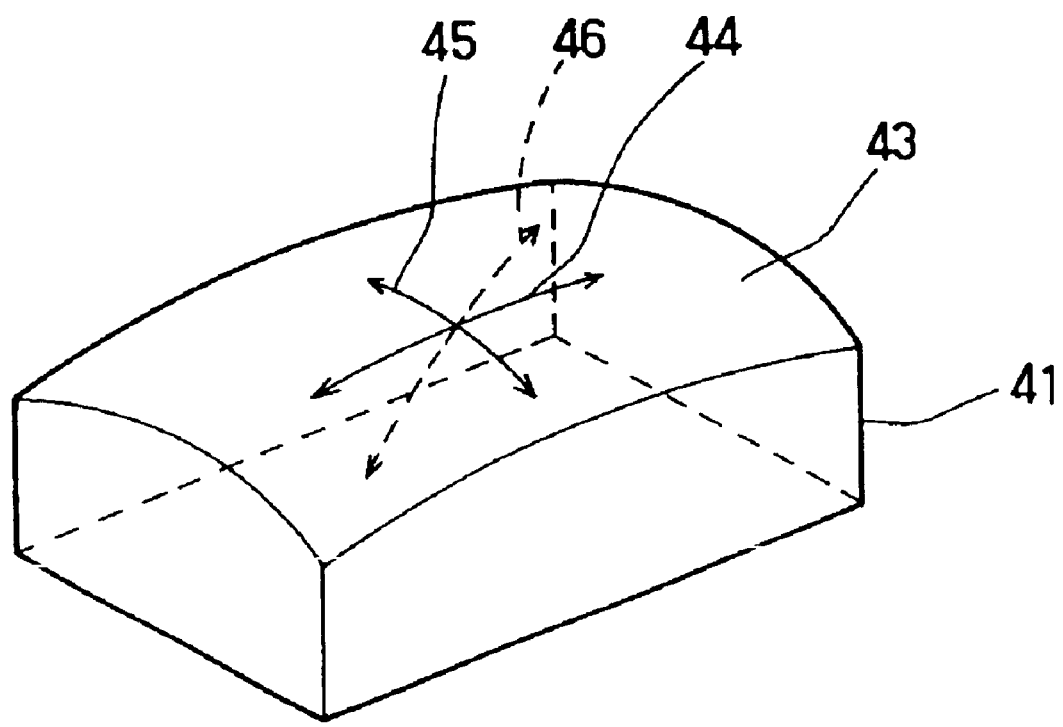
FIG. 2 is a perspective view of a wooden mold used to examine the processing accuracy of an embodiment of a bent glass sheet according to the present invention.

A bent glass sheet in FIG. 4, which is formed so that the first and second curved lines cross perpendicularly to each other, can be brought in close contact with the surface of the wooden mold 41 that is shown in FIG. 2.

The bent glass sheet has higher rigidity in a direction perpendicular to the surface, when compared with a flat or cylindrical glass sheet of the same thickness.

When a vehicle is running at high speed, a windowpane is affected by a force pulling the windowpane outward. When the windowpane is deflected excessively by this force, smooth lifting of the windowpane becomes difficult. However, a bent glass sheet of the present invention can reduce the deflection caused by wind pressure or the like, since the bent glass sheet is bent smoothly in two directions. In other words, a predetermined rigidity can be obtained with a thinner glass sheet, and a lightweight vehicle can be obtained.

Figure 5:
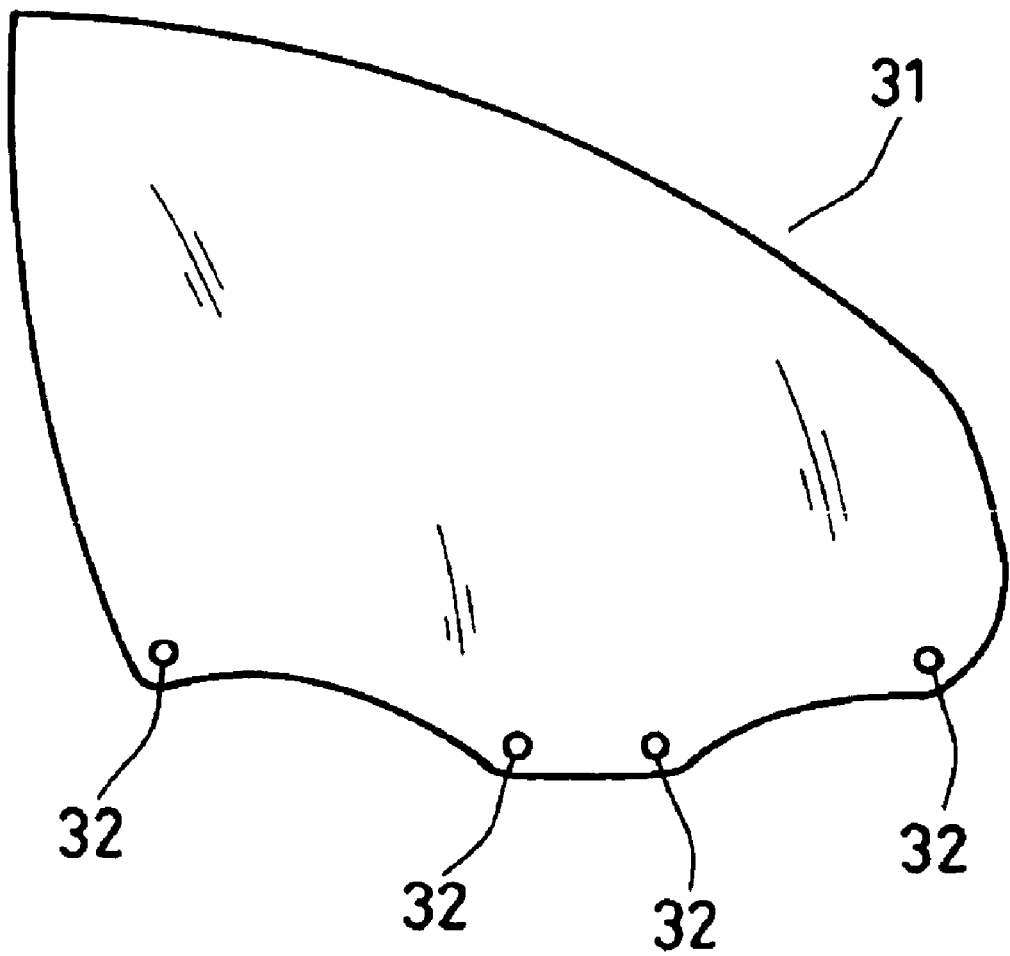
FIG. 5 is an explanatory view to illustrate a process applied to a bent glass sheet according to the present invention.

As shown in FIG. 5, the bent glass sheet 31 can be processed properly, for example, by forming through holes 32 to connect to a lifting mechanism.

The following is an example of windowpanes for a vehicle, in which bent glass sheets of the present invention are used.

Figure 6:
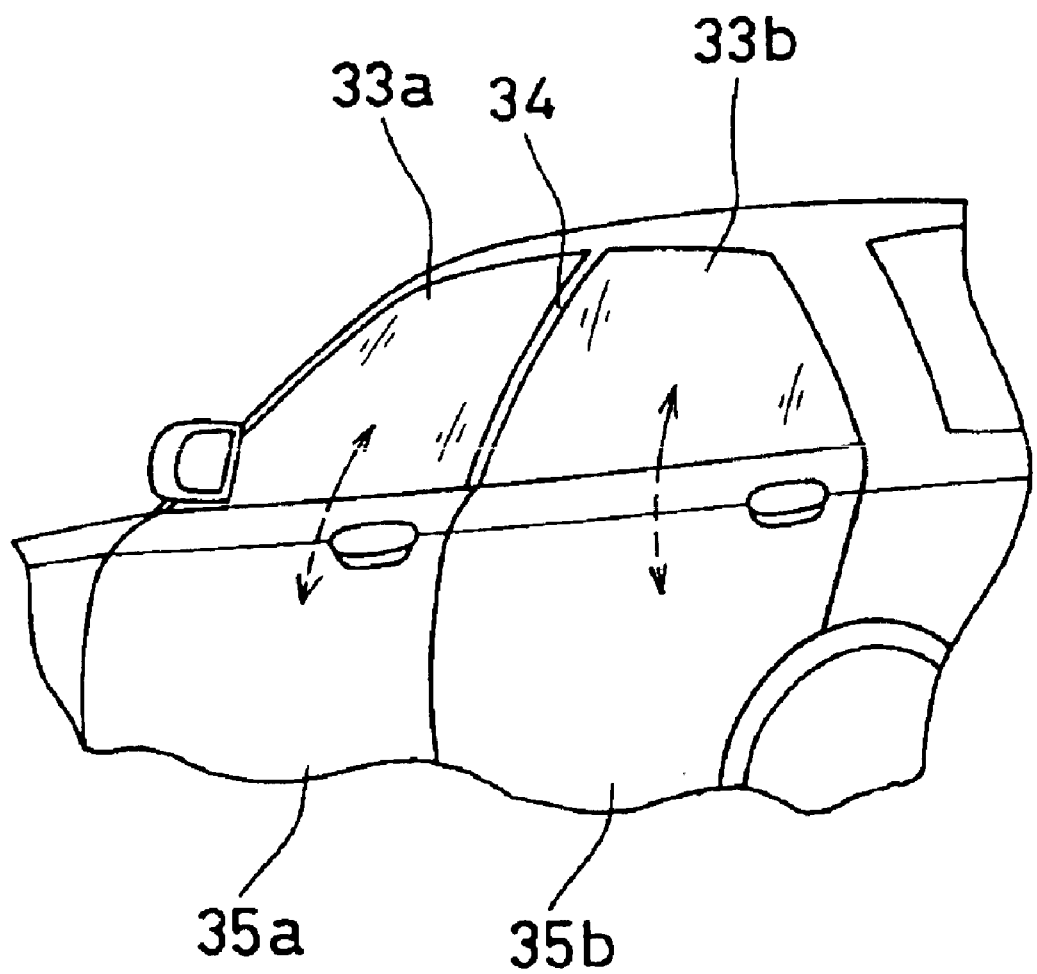
FIG. 6 is a partial perspective view of an automobile to exemplify windowpanes of bent glass sheets according to the present invention.

Glass sheets of the present invention are used for a windowpane 33a of a front door 35a and also for a windowpane 33b of a rear door 35b of an automobile shown in FIG. 6. In this embodiment, the windowpane 33a of the front door 35a lifts along a pillar 34 while the windowpane 33b of the rear door 35b lifts in a substantially vertical direction. When the windows are closed, each windowpane forms a curved line along the longitudinal direction of the vehicle. Therefore, the windowpanes match with the smooth and continuous appearance of the vehicle in the longitudinal direction. Moreover, a reflection can be observed as a continuous image even in the vicinity of the windowpanes. Even if the pillar 34 is thinned to get the windowpanes closer to each other, the reflection does not lose the continuity and the automobile looks congrous.

Figure 7:
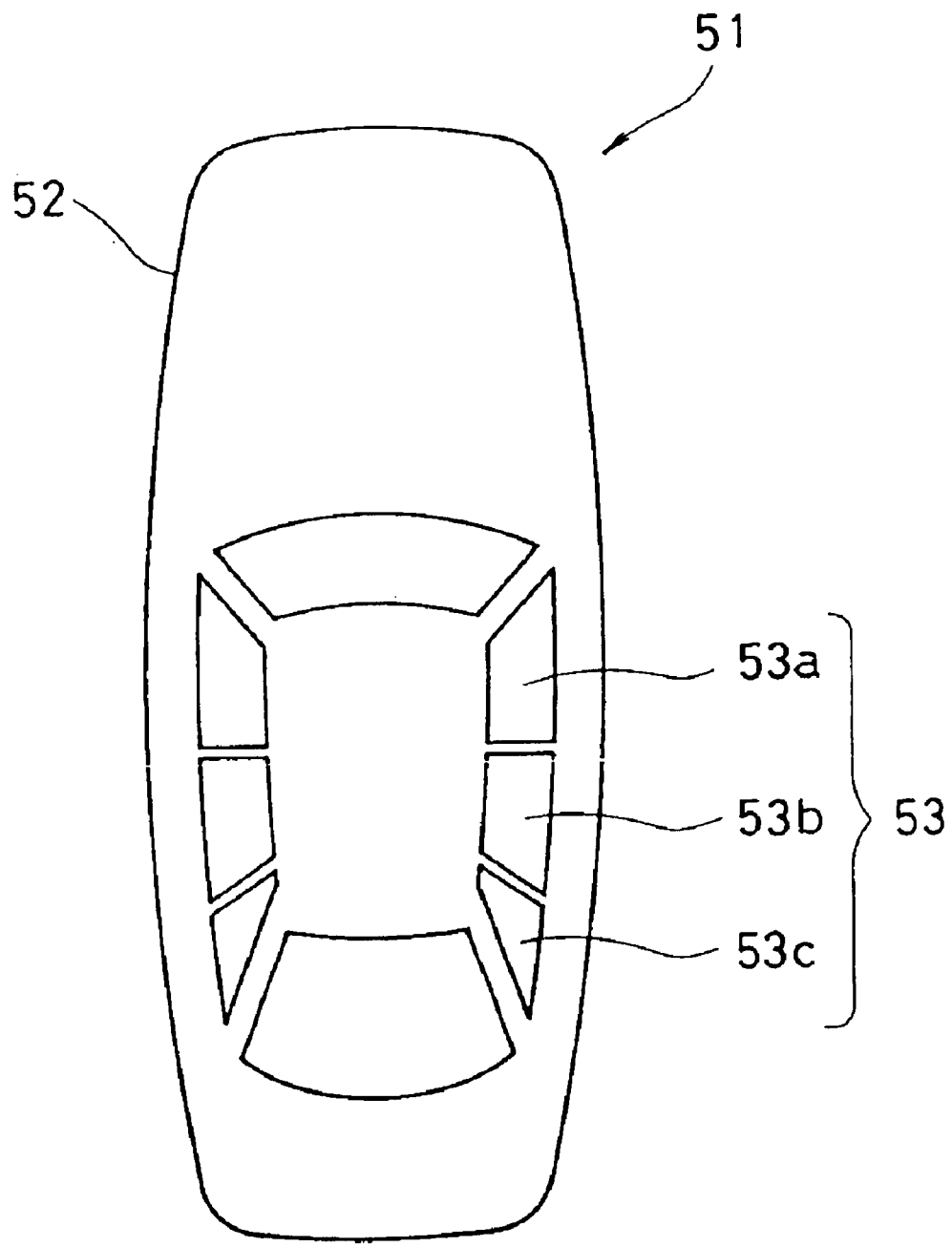
FIG. 7 is a plan view of an automobile to exemplify windowpanes of bent glass sheets of another example according to the present invention.

In an automobile 51 shown in FIG. 7, bent glass sheets of the present invention are used for side windowpanes 53a, 53b and 53c. These windowpanes are positioned to form a curved line having a curvature radius substantially same as the curved contour of the body when viewed from above. While the windowpane 53a of the front door and the windowpane 53b of the rear door can be opened/closed, the rear-quarter windowpane 53c has a fixed glass sheet. As shown in this embodiment, bent glass sheets of the present invention can be used for windowpanes that are opened and closed by sliding upward from door housings. The glass sheets also can be fixed to windows or used for double sliding windows comprising plural glass sheets. The present invention can be used for, not only doors of automobiles as described above, but for various windows of automobiles or any other vehicles.

The following is an explanation about a slit at the upper end of a door in a case that a bent glass sheet of the present invention is used for an automobile door.

Figure 8:
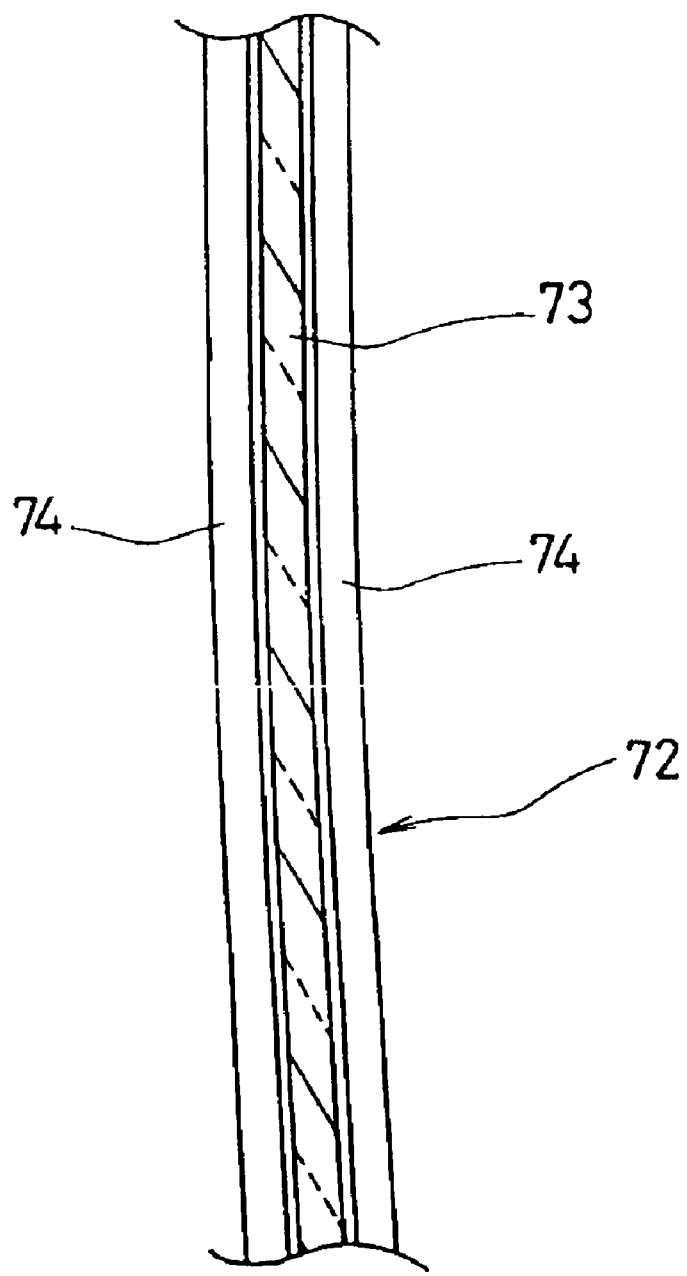
FIG. 8 is a partial plan view of a door slit housing a bent glass sheet according to the present invention.
Figure 9:
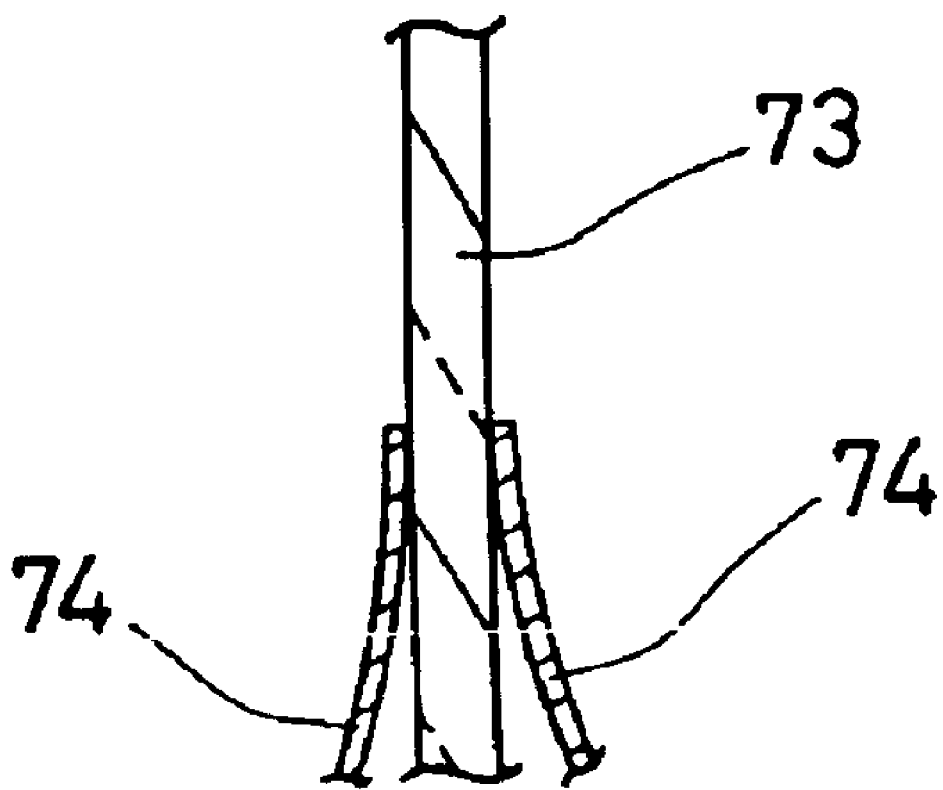
FIG. 9 is a partial cross-sectional view of a door slit housing a bent glass sheet according to the present invention, which is sealed with weatherstrips.

FIG. 8 is a plan view showing a door comprising a bent glass sheet of the present invention viewed from the upper end (slit) side. A bent glass sheet 73 of the present invention matches with the door slit 72 of the automobile door in the longitudinal direction of the vehicle. Therefore, the clearance created by the glass sheet 73 and the automobile body is maintained constant, and the slit can be sealed precisely by the weatherstrips 74 (FIG. 9). As described above, the glass sheet 73 appearing from the slit 72 is positioned stably any time without regard to the lifting state of the glass sheet, and the slit is always sealed precisely.

Figure 32:
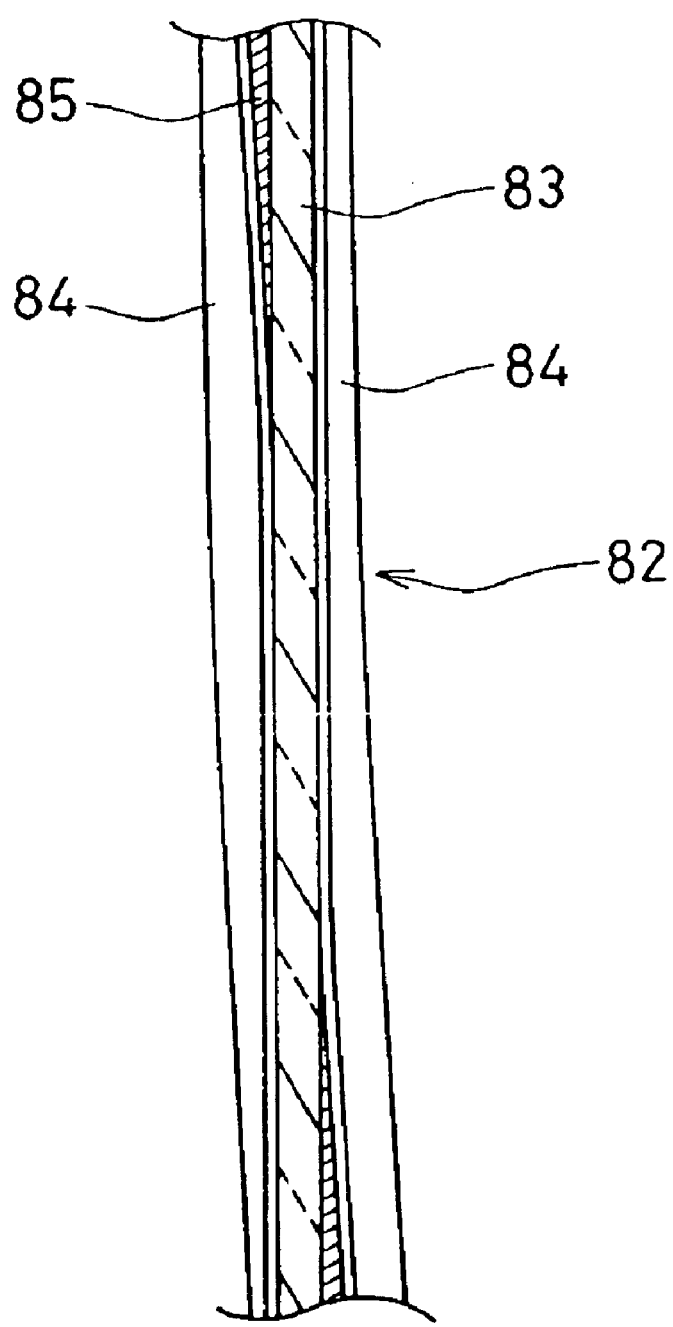
FIG. 32 is a plan view of a door slit curved in the vehicle's longitudinal direction, in which a conventional bent glass sheet is housed.
Figure 33A:
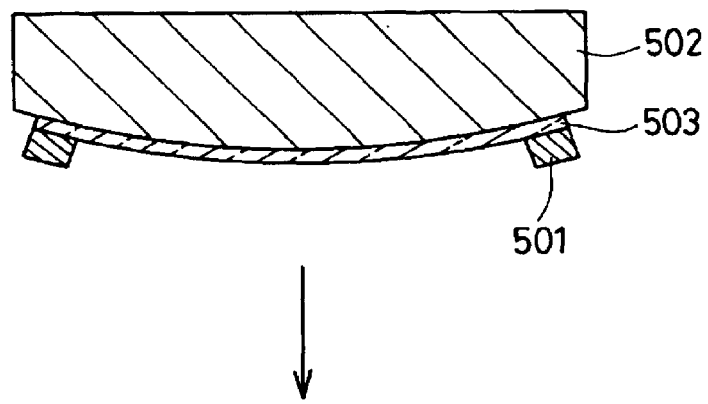
Figure 33B:
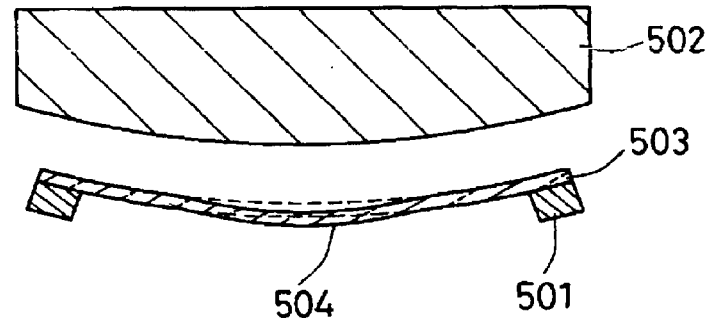

When a conventional glass sheet with poor processing accuracy is used for a similar slit 82 as is shown in FIG. 32, a space 85 is created between each weatherstrip 84 and a glass sheet 83. In a region where the weatherstrips 84 are positioned extremely close to the body, the weatherstrips 84 are pressed hard against the glass sheet, and thus, friction is increased when the glass sheet lifts.

As mentioned above, a bent glass sheet according to the present invention is especially preferable for a glass sheet used for a vehicle's door.

The following is a description of the preferred embodiments of the present invention with reference to the accompanying drawings.

First Embodiment in Manufacturing Method

Figure 10:
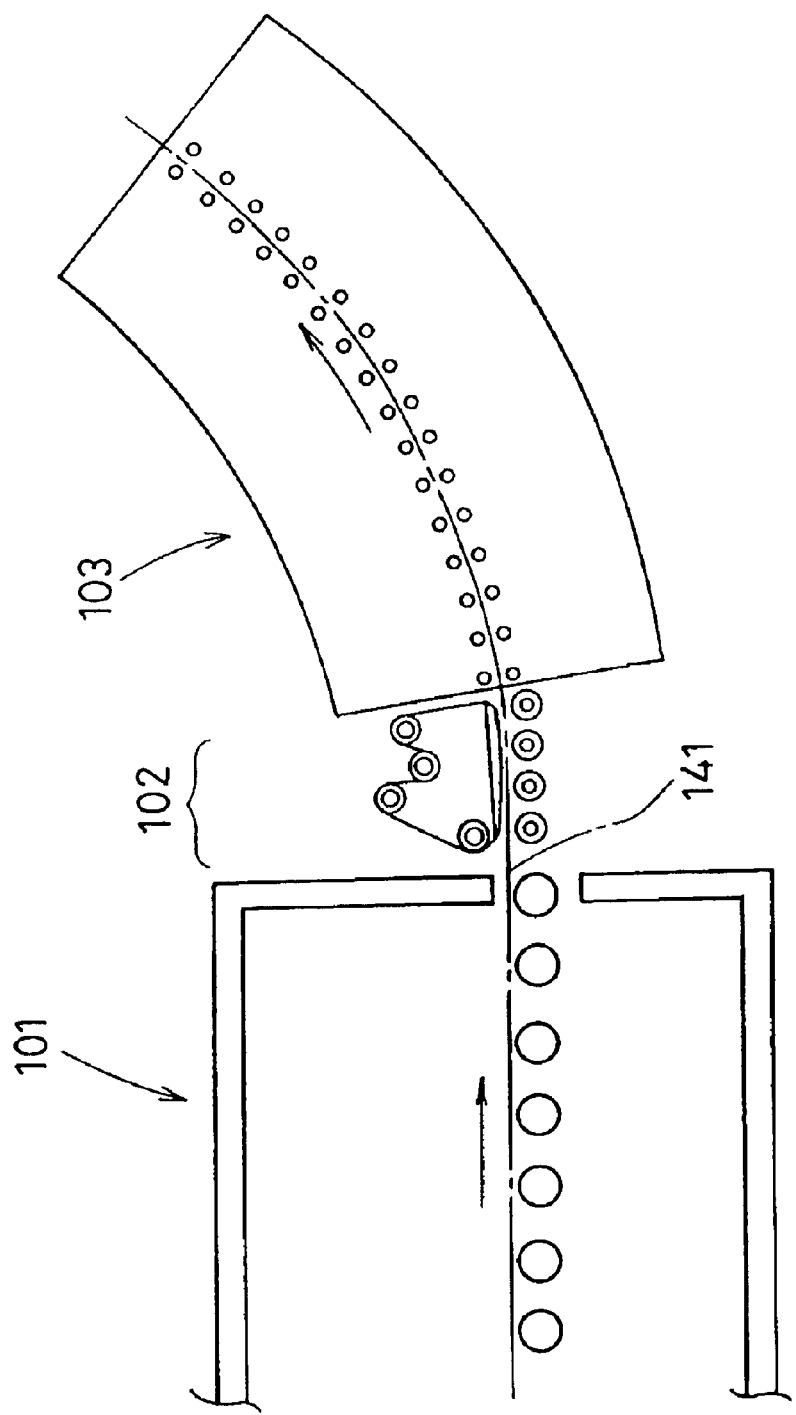
FIG. 10 is a cross-sectional view of an embodiment of an apparatus for manufacturing a bent glass sheet according to the present invention.

FIG. 10 is a cross-sectional view of an embodiment of an apparatus for manufacturing a bent glass sheet of the present invention. As is shown in FIG. 10, this manufacturing apparatus comprises a furnace 101, a bending device 102, and a quenching device 103, which use a continuous common conveying passage 141 for glass sheets. Inside the furnace 101, the conveying passage 141 is substantially horizontal. Inside the bending device 102, it gradually slopes upwards and away from the horizontal direction, and inside the quenching device 103, it describes a curved line with a predetermined curvature radius.

Figure 11:
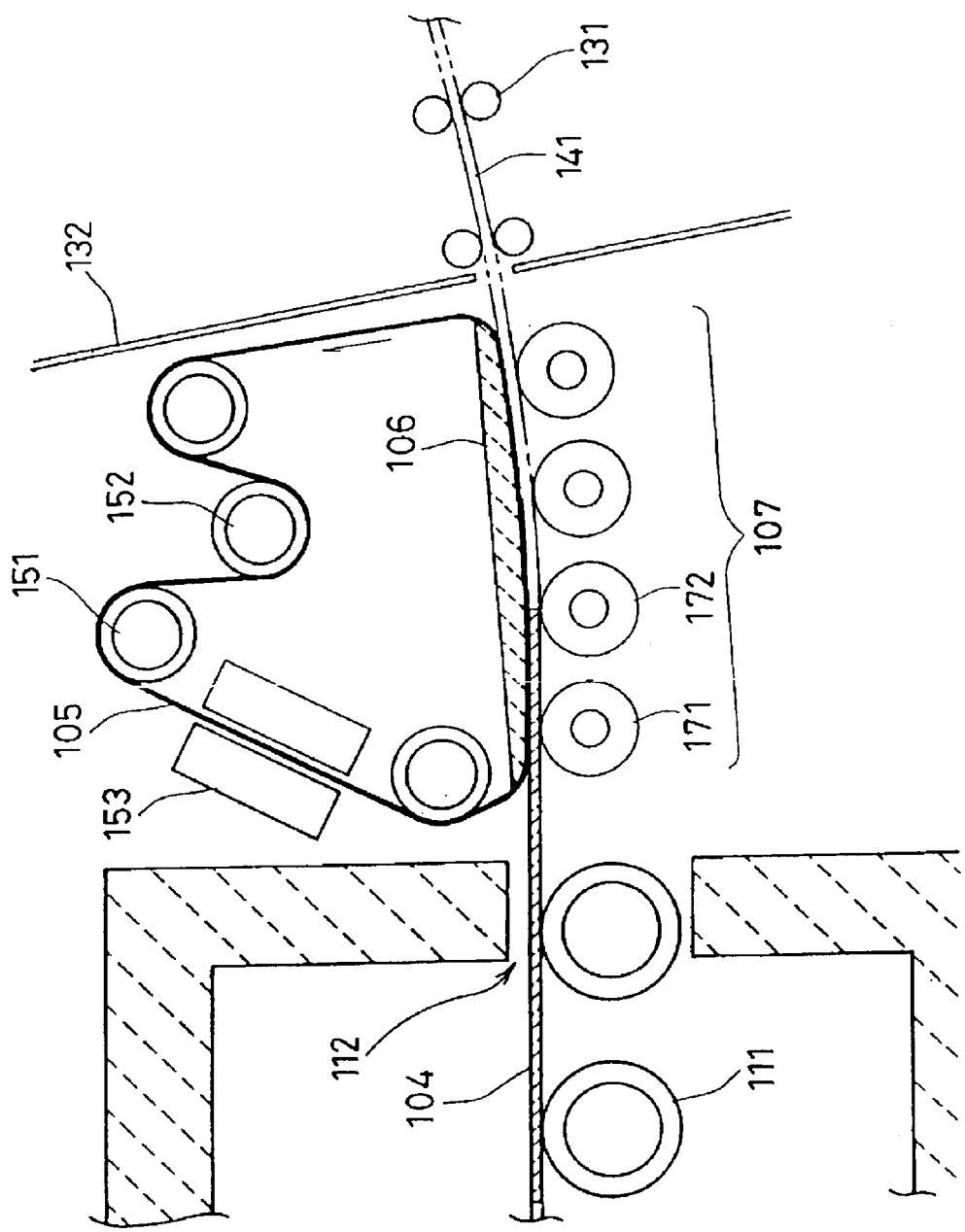
FIG. 11 is an enlarged cross-sectional view showing a bending region of the apparatus shown in FIG. 10.

FIG. 11 is an enlarged cross-sectional view showing the bending region of the apparatus shown in FIG. 10. As shown in FIG. 11, in the bending region provided with a bending device 102, press rollers 107 are arranged below the conveying passage 141, and a bending member 106 is arranged above the conveying passage 141. Furthermore, a heat-resistant belt 105 is arranged to travel along the conveying passage 141, between the conveying passage 141 and the bending member 106.

The heat-resistant belt 105 is suspended in a loop-shape by rollers and by the bending member, and forms an endless track. The rollers include a driving roller 151 and a tension controlling roller 152. A driving device (not shown in the drawing) is connected to the driving roller 151. Moreover, by adjusting the position of the tension controlling roller 152, the tension of the heat-resistant belt 105 can be adjusted to suitable conditions. Moreover, a belt temperature adjusting device 153 is arranged on both sides of the endless track of the heat-resistant belt 105. By heating or cooling with the belt temperature adjusting device 153, the temperature of the heat-resistant belt 105 can be kept within a range that is suitable for forming.

The heat-resistant belt 105 is made of a heat-resistant fiber, such as for example metal fiber, inorganic fiber, graphite fiber, or aramid fiber. The heat-resistant material for the heat-resistant belt 105 can be obtained by weaving, twilling, or knitting for example. It is also possible to form heat-resistant material into a felt or a net so as to obtain the heat-resistant belt 105. It is preferable that the heat-resistant belt 105 is sufficiently wide to cover the conveying passage 141.

As is shown in FIG. 11, a part of the surface of the bending member 106 is in contact with the endless track defined by the heat-resistant belt 105, and a part thereof faces the conveying passage 141. The surface of the bending member 106 that faces the conveying passage 141 functions as a shaping surface for bending the glass sheet. This surface is convex in the conveying direction of the glass sheet. As a material for the bending member 106, various metals and ceramics can be used. The bending member 106 can be formed in one piece as is shown in FIG. 11, but it is also possible to form it as a combination of a plurality of separate members.

Figure 12:
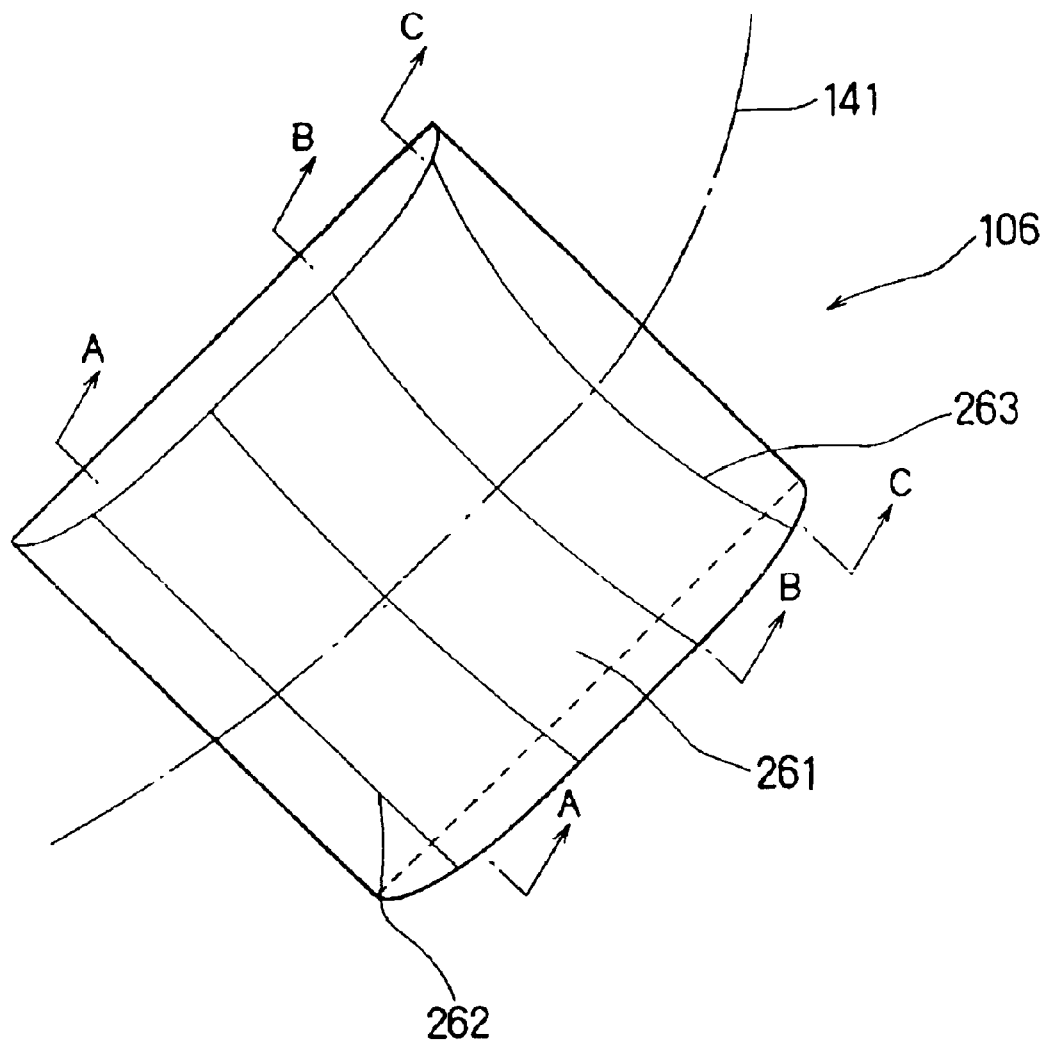
FIG. 12 is a perspective view of an embodiment of a bending member.
Figure 13A:
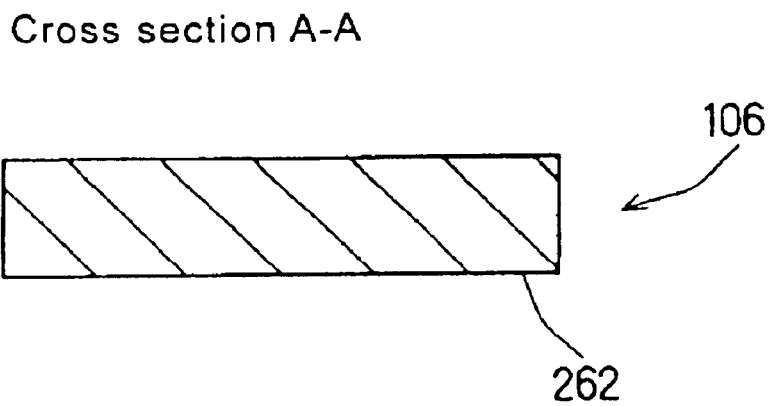
FIGS. 13A, 13B and 13C are cross-sectional views of the bending member in FIG. 12, taken along lines A—A, B—B and C—C respectively.
Figure 13B:
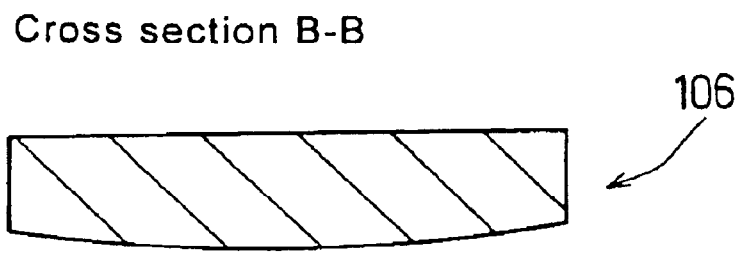
Figure 13C:
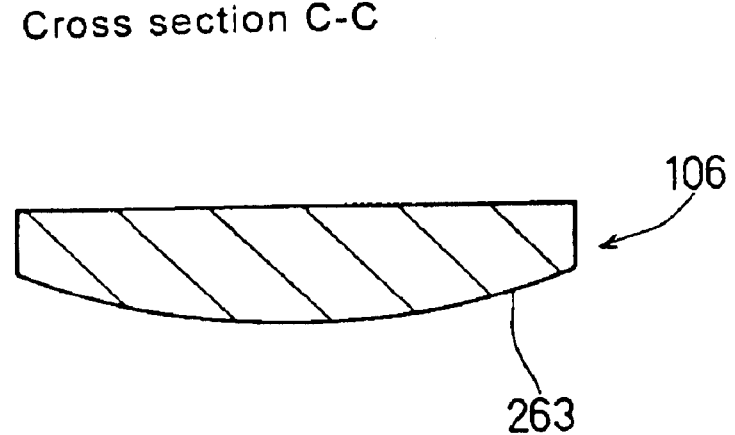
Figure 14A:
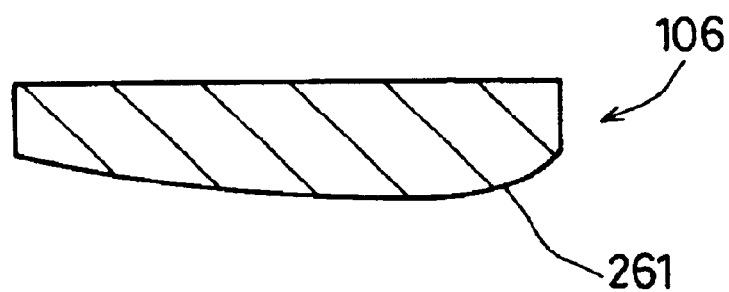
FIG. 14A is a cross-sectional view of an embodiment of another bending member.
Figure 14B:
FIG. 14B is a cross-sectional view of a glass sheet bent by using the bending member shown in FIG. 14A.

FIG. 12 is a perspective view showing the shaping surface 261 of the bending member 106 from below the conveying passage. FIGS. 13A–13C are cross-sectional views of the bending member 106 in FIG. 12, taken along the lines A—A, B—B, and C—C, respectively. Near the line of first contact 262, where the glass sheet contacts the bending member 106 first, the shaping surface 261 is flat (FIG. 13A). Proceeding in the conveying direction of the conveying passage 141, the shaping surface 161 bends gradually (FIG. 13B). Near the line of last contact 263, where the glass sheet separates from the bending member 106, the shaping surface 161 applies to the glass sheet a predetermined curved shape in the cross direction of the glass sheet (FIG. 13C). This curved shape can have for example a predetermined curvature radius $R_2$, or it can be for example an arch with an eccentric vertex, as is shown in FIG. 14A. The shaping surface 261 in FIG. 14A can provide a bent glass sheet 261a shown in FIG. 14B.

As shown in FIGS. 10 and 11, near the line of first contact, the shaping surface 261 is parallel to the direction in which the glass sheet is conveyed from the furnace (horizontal direction). However, proceeding in the conveying direction, the shaping surface gradually slopes upwards and away from the horizontal direction. Near the line of last contact, the shaping surface 261 has substantially the same curvature radius $R_1$ as the conveying passage 141 inside the quenching device.

It is preferable to provide the bending member 106 with a heater for the purpose of preventing glass sheets in the early stage of a continuous production from being adversely affected by the bending member 106 whose temperature is not sufficiently high.

The press rollers 107 are arranged along the lower side of the conveying passage 141. The purpose of these press rollers 107 is to press the glass sheet against the bending member 106 while it is travelling along the conveying passage 141. The press rollers 107 are connected to a position-adjusting mechanism so as to control the pressure applied to the bending member 106. Like the belt 105, the surface of the press rollers 107 is made of a heat-resistant material. It is preferable that a material such as felt is used that cushions the glass sheet. The press rollers 107 are connected to a driving means (not shown) to rotate them with the rotational velocity that is necessary to convey the glass sheet. It is also possible that the press rollers 171, 172 etc. are non-driven rollers (free rollers) that rotate with little external force. In such a case, the respective rollers 107 are preferred to rotate independently. The number of press rollers 107 can be determined in accordance with the desired curved shape for the glass sheet, but in general, at least two rollers are necessary. It is preferable to provide at least five rollers.

For the press rollers, a rod can be used that is made, for example, of an elastic body to which a supporting member for supporting the glass sheet has been attached. For this supporting member, a plurality of disk-shaped or cylindrical flexible sleeves can be used, for example. Furthermore, the rollers do not have to be formed of one body, and it is also possible to use a plurality of rollers across the cross direction of the glass sheet.

Figure 15:
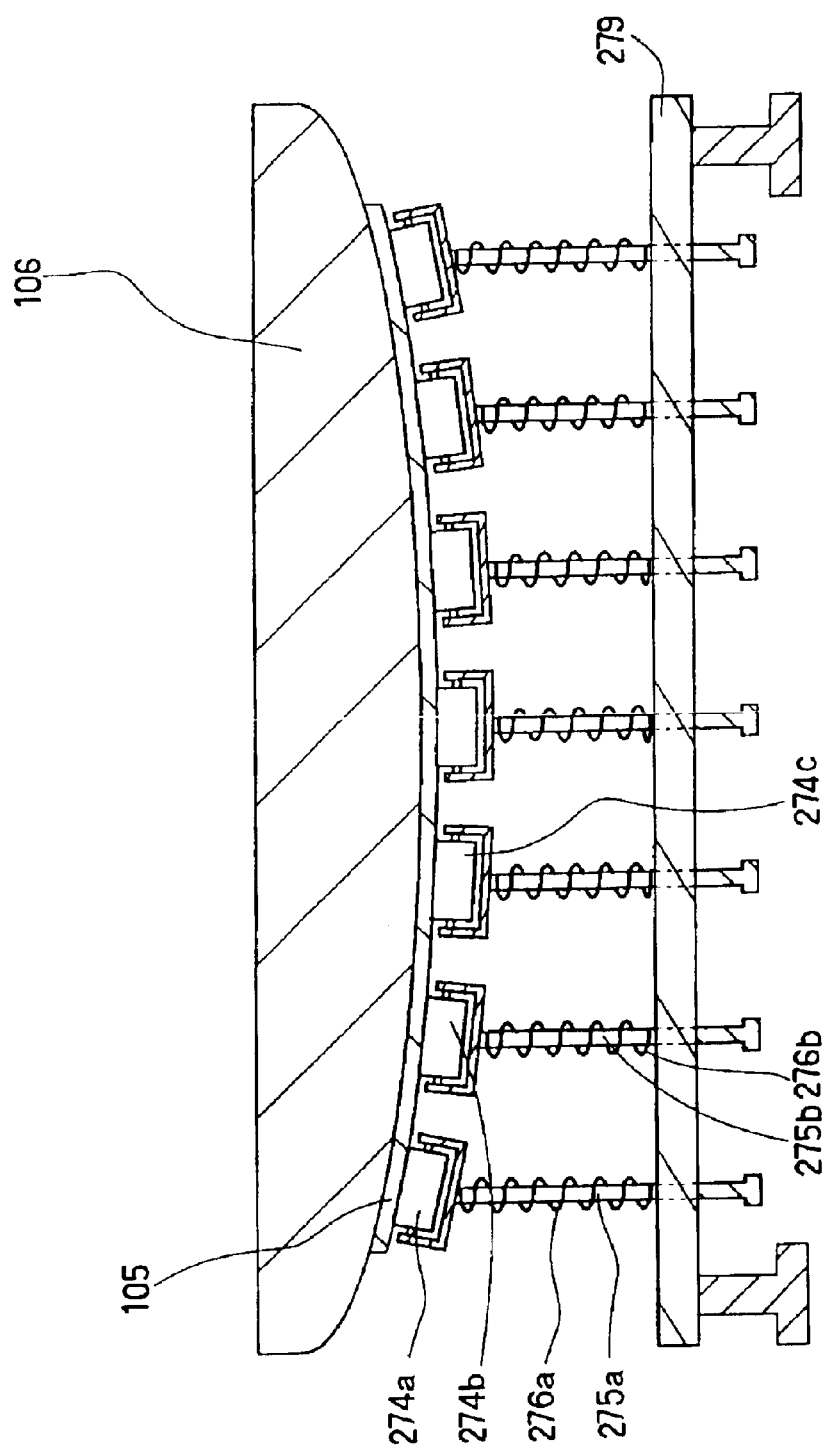
FIG. 15 is a cross-sectional view of an embodiment of a bending device (mold) used to manufacture a bent glass sheet according to the present invention, and the bending device is viewed from the cross-section of the conveying passage.

FIG. 15 is a cross-sectional view of a bending device using a plurality of rollers as press rollers 274, taken from the furnace side. The press rollers 274a, 274b, 274c, etc. in FIG. 15 are attached to the ends of rods 275a, 275b, etc. Moreover, the rods 275a, 275b, etc. are inserted into a base member 279 from which they can freely ascend and descend. The rods 275a, 275b, etc. are pushed upwards by springs 276a, 276b, etc., whose lower end is defined by the base member 279. As a result, the rollers 274a, 274b, 274c, etc. push the heat-resistant belt 105 (and when a glass sheet is passed along, the glass sheet and the heat-resistant belt) against the bending member 106.

Figure 16:
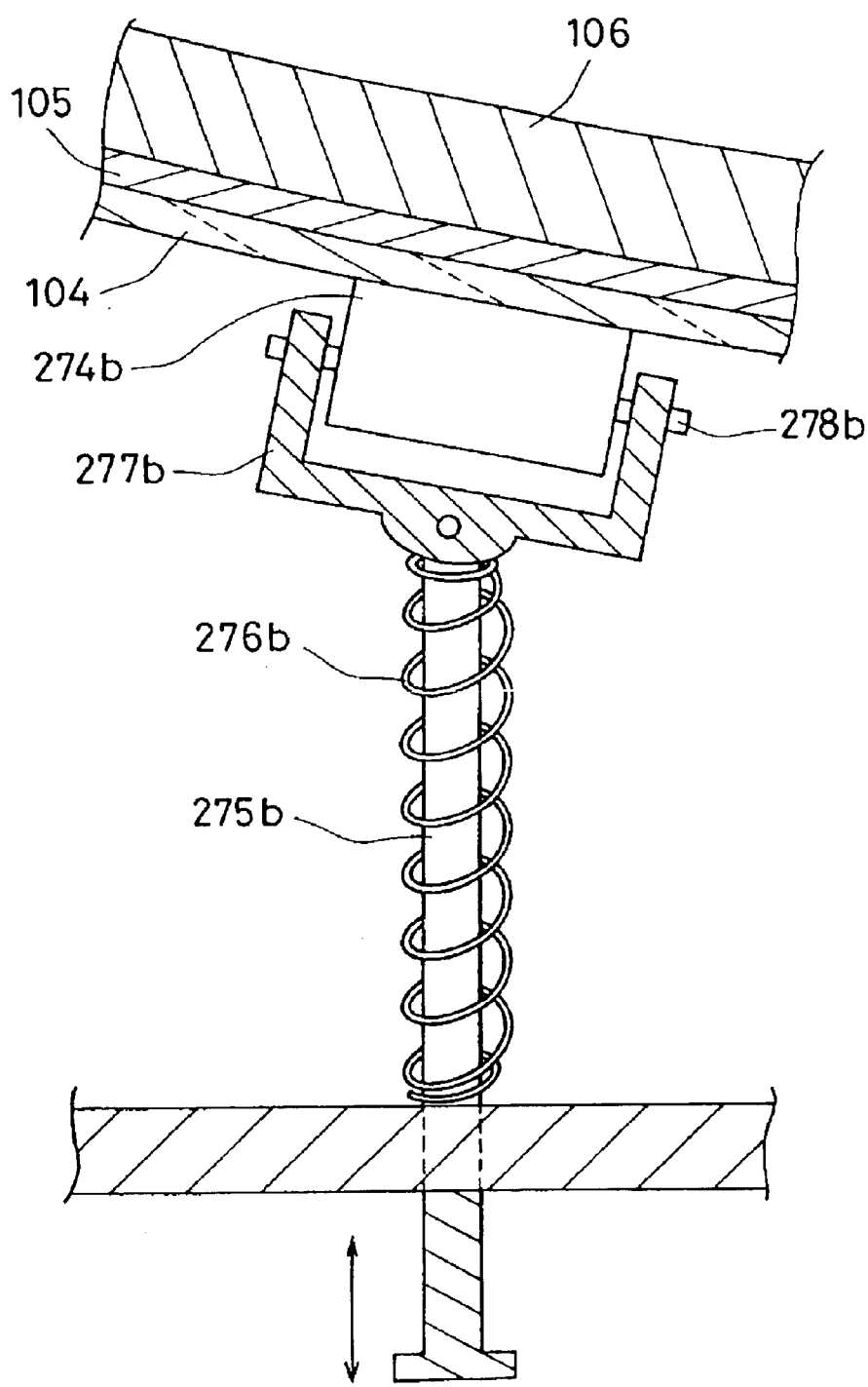
FIG. 16 is an enlarged view showing a portion of the device shown in FIG. 15.

FIG. 16 shows an enlargement of the press roller 274b. The press roller 274b is attached to an axis 278b that is supported rotatably by a supporting member 277b. The supporting member 277b is attached to the end of the rod 275b and is freely tiltable in the cross direction of the glass sheet. Thus, a plurality of free rollers 274a, 274b, 274c, etc. that are arranged in the cross direction of the glass sheet 104 are used as members for pressing the glass sheet 104 together with the belt 105 against the bending member 106. If these rollers are tiltable in the cross direction of the glass sheet, and each roller is pressed into the direction of the bending member, then each portion of the surface of the glass sheet can be pressed precisely against the bending member.

Figure 17:
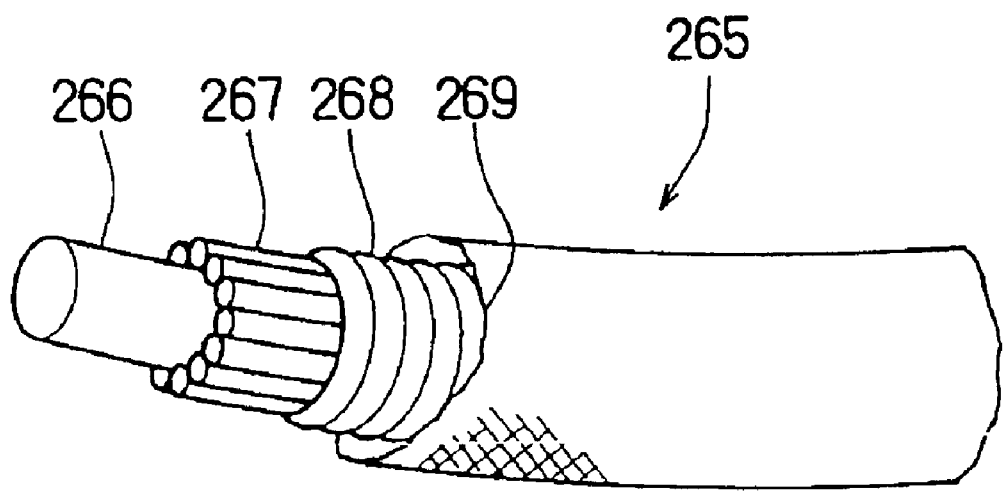
FIG. 17 is a perspective view showing the an embodiment of a press roller used to manufacture bent glass sheets according to the present invention.
Figure 18:
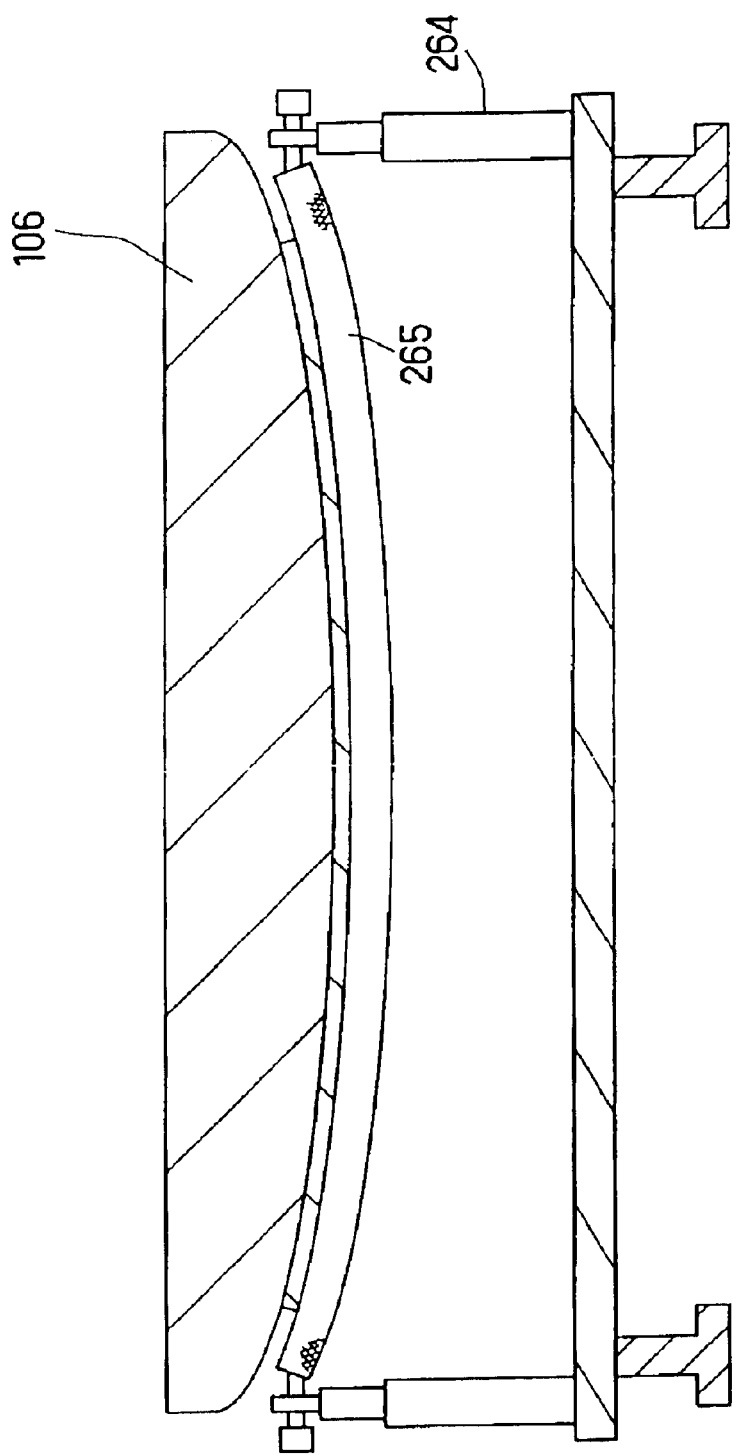
FIG. 18 is a cross-sectional view of an example of a bending device (bending region) using the press roller shown in FIG. 17.

FIGS. 17 and 18 show in example of an integrated press roller. As is shown in FIG. 17, this roller 265 comprises a bendable core 266 made of an elastic material, rods 267 made of elastic material that are arranged around and along the core 266, a coil spring 268 wrapped around the core 266 and the rods 267, and a sleeve 269 made of a heat-resistant material that covers the coil spring 268. As is shown in FIG. 18, the surface of the glass sheet is precisely pressed against the bending member by supporting both ends of the roller 265 rotatably with a supporting member 264 provided with a mechanism to adjust the height.

In the bending region, the conveying passage 141 proceeds along the belt 105, between the bending member 106 and the press rollers 107. The conveying passage 141 inside the bending region is substantially horizontal upstream near the carry-out opening 112 of the furnace. Proceeding in the conveying direction, the conveying passage 141 gradually bends, and slopes upwards and away from the horizontal direction. In some cases, the conveying passage 141 can be formed to slope gradually downwards and away from the horizontal direction. A typical conveying passage 141 has a curvature that changes continuously. The conveying passage 141 is determined to have a substantially constant curvature in the vicinity of the quenching device 103 when viewed from the side of the quenching device 103. This constant curvature is continuously provided to the conveying passage inside the quenching device.

For the furnace 101 and the quenching device 103 in FIG. 10, in general a conventionally used device can be used. There is no particular limitation concerning the glass conveying means in the furnace 101, but rollers 111 are preferable, considering heating efficiency.

The quenching device 103 is annexed to quench the bent glass sheet by blowing cooled gas from a cooled gas-blowing nozzle (not shown) while conveying the glass sheet on the conveying passage having a predetermined curvature. However, the bent glass also can be gradually cooled (annealed), while being conveyed along the conveying passage. Moreover, a converter for changing the conveying direction of the glass sheet into a predetermined direction (for example the horizontal direction) can be set up further downstream of the quenching device 103.

If the glass sheet is conveyed horizontally after the bending process, the heated glass sheet can be deformed. However, in this embodiment, the glass sheet is cooled to a temperature not to cause deformation while it travels along the conveying passage having the same curvature of the bent glass sheet.

The following is an example of a method for manufacturing a bent glass sheet using the above-described apparatus.

A glass sheet 104 made of soda lime silica glass is heated in a furnace 101 to a temperature near its softening point (for example to a temperature between the strain point and the softening point of the glass), while conveying rollers 111 inside the furnace 101 convey it in a horizontal direction, and is released in a shapeable state in horizontal direction through a carry-out opening 112 of the furnace 101. When the front end of the glass sheet 104 is inserted into the bending device 102, it is sandwiched between the first press roller 171, which is located at the most upstream position, and the bending member 106. The roller 171 presses the glass sheet 104 against the bending member 106 through the belt 105. Since the surfaces of the press rollers 107 are made of a heat-resistant felt, the press rollers 107 are deformed to maintain the contacting area to be a predetermined level or above.

The belt 105, which is made of a belt cloth using stainless steel fibers, travels downstream in the glass conveying direction with a constant velocity while sliding along the shaping surface of the bending member 106, guiding the glass sheet 104 downstream. Then, the front end of the glass sheet 104 reaches the second press roller 172, as is shown in FIG. 11. The travelling speed of the belt 105 is preferably set to a speed in the range of 80 mm/sec–400 mm/sec. At this stage, the glass sheet 104 is still substantially flat, since a second shaping has not been performed yet.

From the situation shown in FIG. 11, the glass sheet is conveyed further downstream. First, the glass sheet 104 is pressed against the bending member 106 while the second press roller 172 slowly lifts the front end of the glass sheet upwards. Since the glass sheet is also bent slightly upwards, the bending of the glass sheet 104 begins at this stage.

During the bending, the entire upper surface of the glass sheet 104, which is pressed upwards by the press rollers 107, contacts the belt 105, so that the glass sheet 104 is conveyed while keeping a stable orientation. Since the glass sheet is conveyed while keeping a stable orientation and formed not intermittently but continuously, the surface of the glass sheet is substantially uniform.

Figure 19:
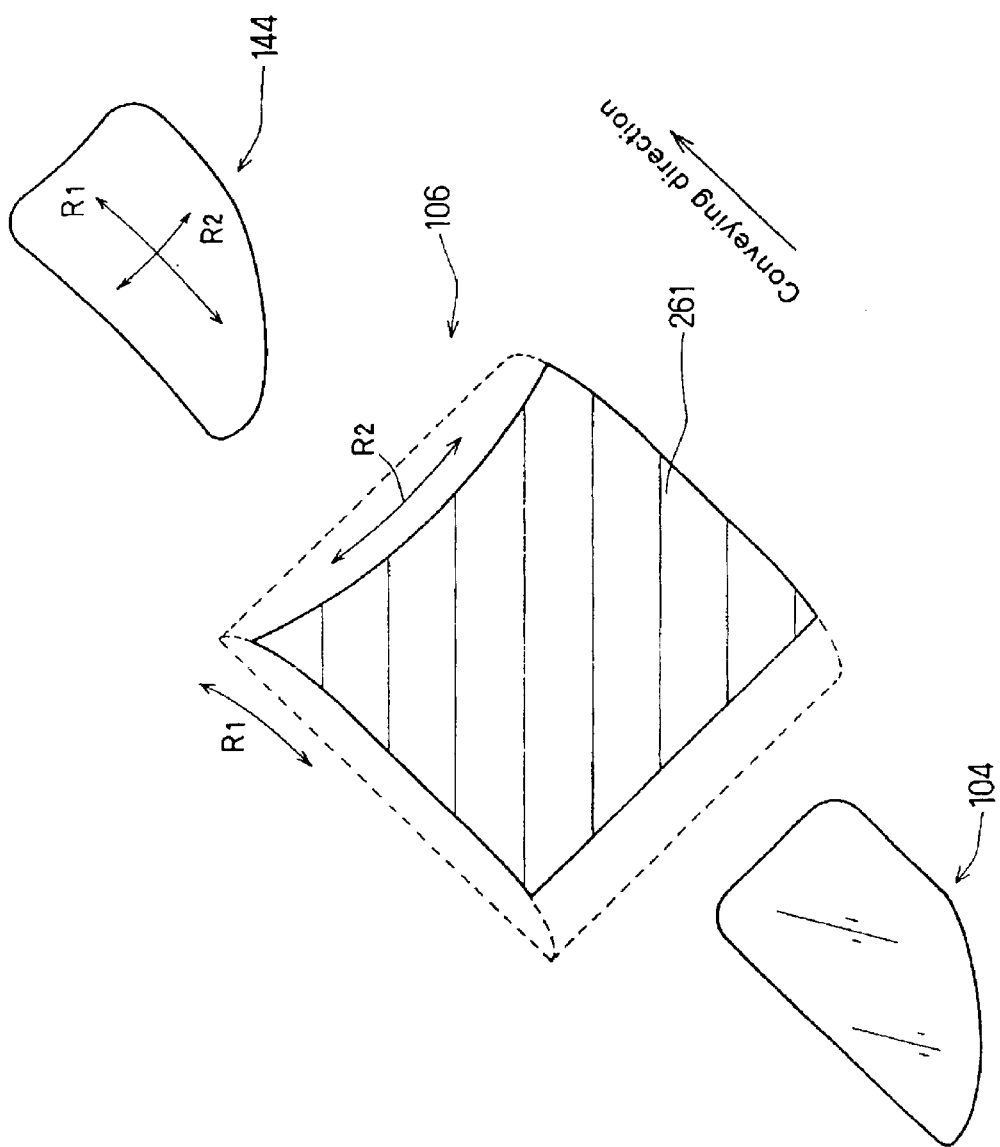
FIG. 19 is a perspective view showing a relationship between the shape of a bent glass sheet according to the present invention and a mold surface.

FIG. 19 shows the glass sheet before and after the bending, together with the shaping surface 261. As is shown in FIG. 19, the flat glass sheet 104 mirrors the shape of the shaping surface 261, so that for example a curvature radius of $R_1$ in the conveying direction of the glass sheet and for example a curvature radius of $R_2$ in the cross direction are imparted on the bent glass sheet 244.

Figure 20:
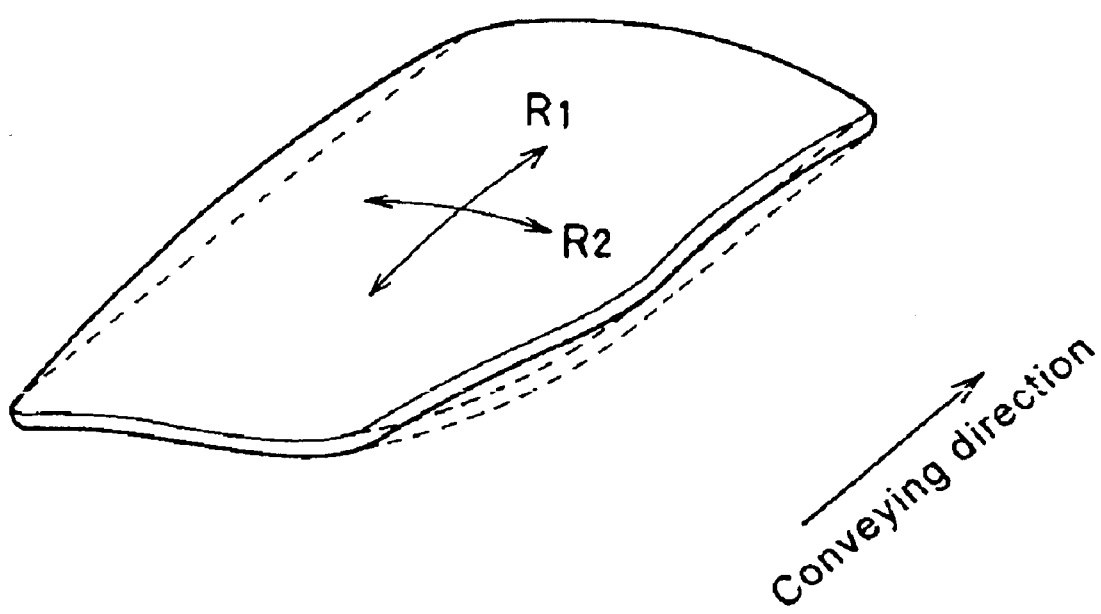
FIG. 20 is a perspective view showing an embodiment of a bent glass sheet according to the present invention.

Referring to FIG. 20, the following explains the shape of the bent glass sheet that can be formed with the method and the apparatus of the present invention. FIG. 20 is a perspective view of a glass sheet that has been formed using the shaping surface 261 shown in FIG. 19. Thus, in accordance with the present invention, bending with a curvature in two directions (two-dimensional bending) can be realized.

After the glass sheet 104 has passed through the bending region and has been formed into a predetermined shape, it passes a slit in a board 132 and is conveyed into the quenching device. In the quenching device, the glass sheet 104 is quenched and tempered by blowing cool air onto it while conveying it at a constant speed with the conveying rollers 131. With this method, tempered bent glass sheets with a curvature radius of 1300 mmR in the conveying direction and a curvature radius of 50000 mmR in the cross direction were obtained continuously.

As described previously, the tempered bent glass sheets were brought in close contact successfully with the wooden mold shown in FIG. 2.

In this method, there is no need to stop the glass sheet for shaping it. During the bending, at least one surface of the glass sheet is retained by the surface of the belt. Consequently, a bent glass sheet with little surface defects can be manufactured continuously and with high efficiency. There is no particular limitation to the thickness of the glass sheet to be manufactured.

Second Embodiment in Manufacturing Method

Figure 21:
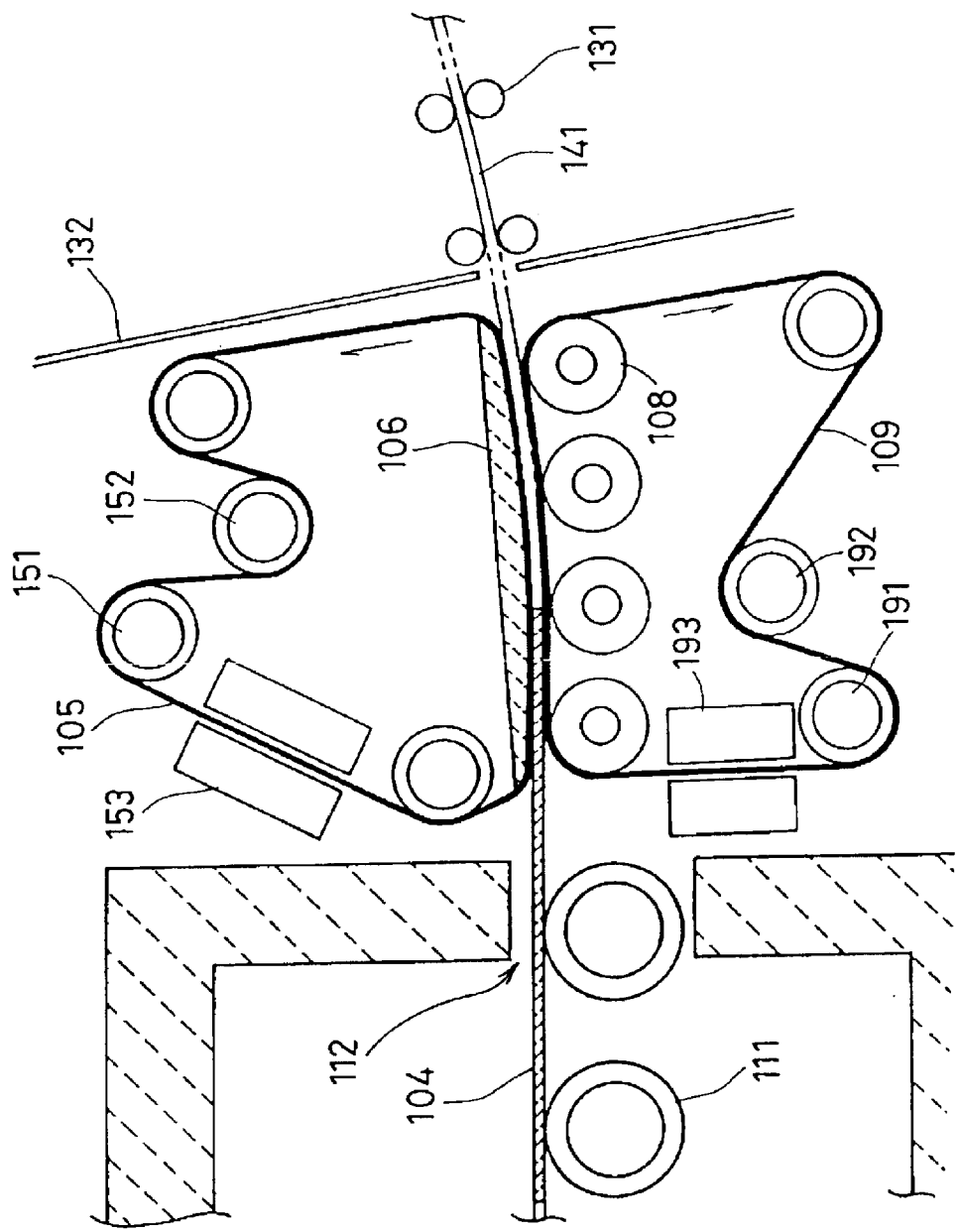
FIG. 21 is a cross-sectional view showing another embodiment of a bending region of an apparatus for manufacturing a bent glass sheet according to the present invention.

FIG. 21 is a cross-sectional view showing another embodiment of a bending region of an apparatus for manufacturing a bent glass sheet according to the present invention. Except for the portion pushing the glass sheet upwards, this device is the same as the device shown in FIG. 11.

In the device shown in FIG. 21, a second belt 109 is suspended by lower press rollers 108 below the conveying passage 141. Via the first belt 105 and the second belt 109, the press rollers 108 press the glass sheet 104 against the bending member 106.

Like the first belt 105, the second belt 109 is suspended in a loop-shape by rollers that include a driving roller 191 and a tension roller 192, and forms an endless track. A driving device (not shown in the drawings) is connected to the driving roller 111. By adjusting the position of the tension roller 192, the tension of the second belt 109 can be adjusted to suitable conditions. Moreover, a belt temperature adjusting device 193 is arranged on both sides of the endless track of the second belt 109. The temperature of the second belt 109 can be adjusted by heating or cooling with the temperature adjusting device 193. Preferable materials and manufacturing methods for the second belt 109 are the same as for the first belt 105.

With the device shown in FIG. 21, the glass sheet 104 can be conveyed while sandwiching and pushing both faces between the belts 105 and 109. Thus, the condition of the surface of the bent glass can be improved even further.

Third Embodiment in Manufacturing Method

Figure 22:
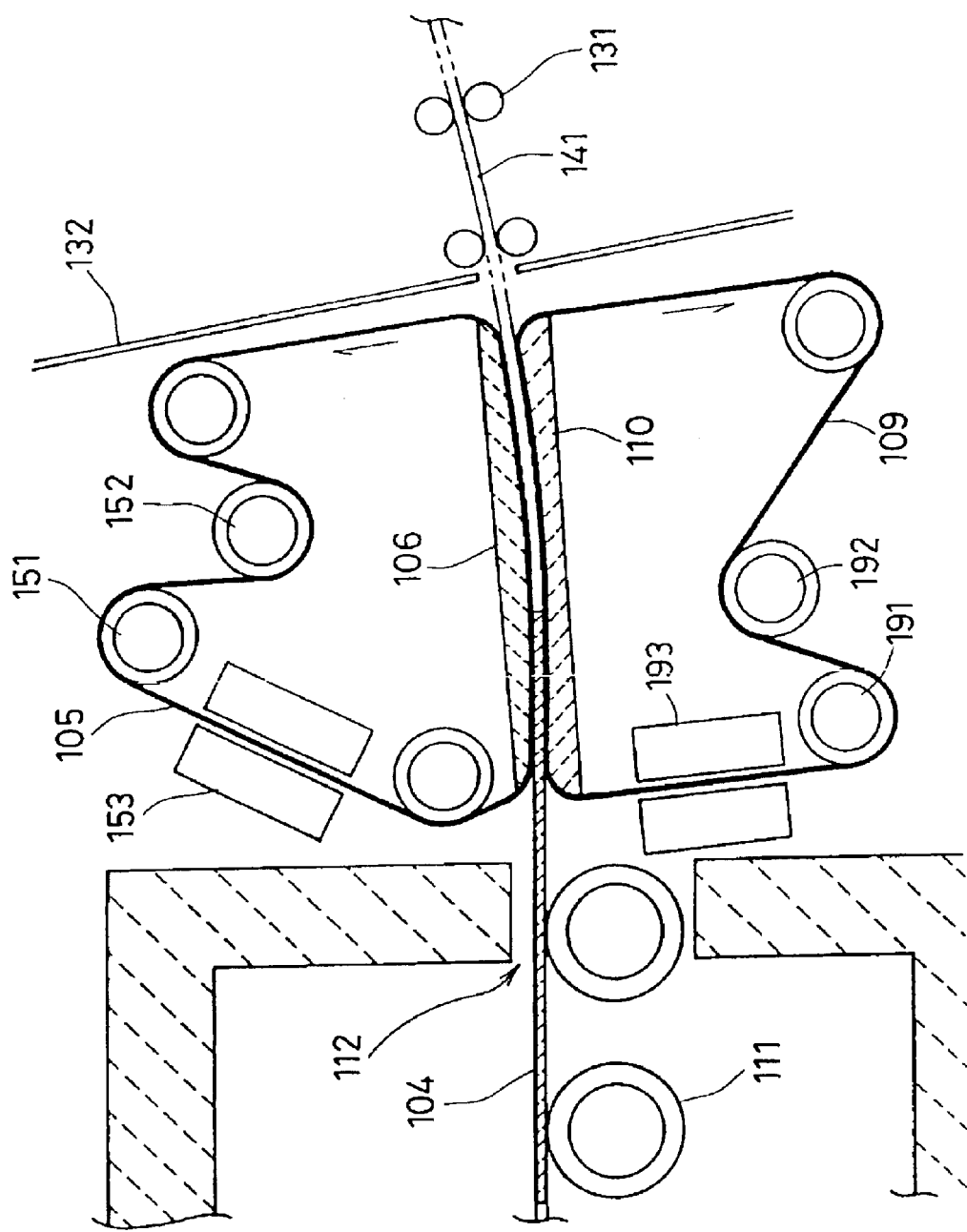
FIG. 22 is a cross-sectional view showing still another embodiment of a bending region of an apparatus for manufacturing a bent glass sheet according to the present invention.

FIG. 22 is a cross-sectional view showing another embodiment of a bending region of an apparatus for manufacturing a bent glass sheet according to the present invention. Except for the part pushing the glass sheet upwards, this device is the same as the devices shown in FIGS. 11 and 12.

In the device shown in FIG. 22, a second belt 109 is suspended by a bending member 110 below the conveying passage 141. Via the first belt 105 and the second belt 109, the lower bending member 110 presses the glass sheet 104 upwards against the bending member 106. At the same time, the upper bending member 106 presses the glass sheet 104 against the lower bending member 110. Because the shaping surface of the lower bending member 110 has the inverse shape of the shaping surface of the upper bending member 106, both shaping surfaces can be fitted into each other.

With the device shown in FIG. 22, the two faces of the glass sheet 104 are sandwiched by the belts 105 and 109, and the glass sheet is conveyed while this pressure is being exerted on it. Consequently, like in the device shown in FIG. 21, the surface condition of the bent glass sheet can be improved even further.

In the devices in FIGS. 21 and 22, which have belts arranged on both sides of the conveying passage, the glass can be conveyed by driving both belts, but it is also possible to have one belt running freely, and convey the glass sheet by driving only the other belt.

Fourth Embodiment in Manufacturing Method

A bent glass sheet of the same shape as the one manufactured in the First Embodiment in Manufacturing Method was manufactured, exchanging the conveying direction and cross direction. In other words, the curvature radius in the glass sheet conveying direction was set to 50000 mmR and in cross direction to 1300 mmR. For the bending, basically the same device as is shown in FIGS. 10 and 11 was used except for the bending member.

However, since the curvature radius $R_1$ imparted on the glass sheet with respect to the conveying direction was larger, the conveying passage 141 in the quenching device described a smoother curved line, and as a result, the cooled glass sheet could be retrieved at a lower position and at an angle that was closer to the horizontal plane than shown in FIG. 10. This facilitated subsequent handling.

Thus, by setting $R_1 > R_2$, wherein $R_1$ is the curvature radius in the conveying direction and $R_2$ is the curvature radius in the cross direction, the conveyance of the glass sheet in the quenching device and subsequent handling of the glass sheet was facilitated.

Fifth Embodiment in Manufacturing Method

Figure 23:
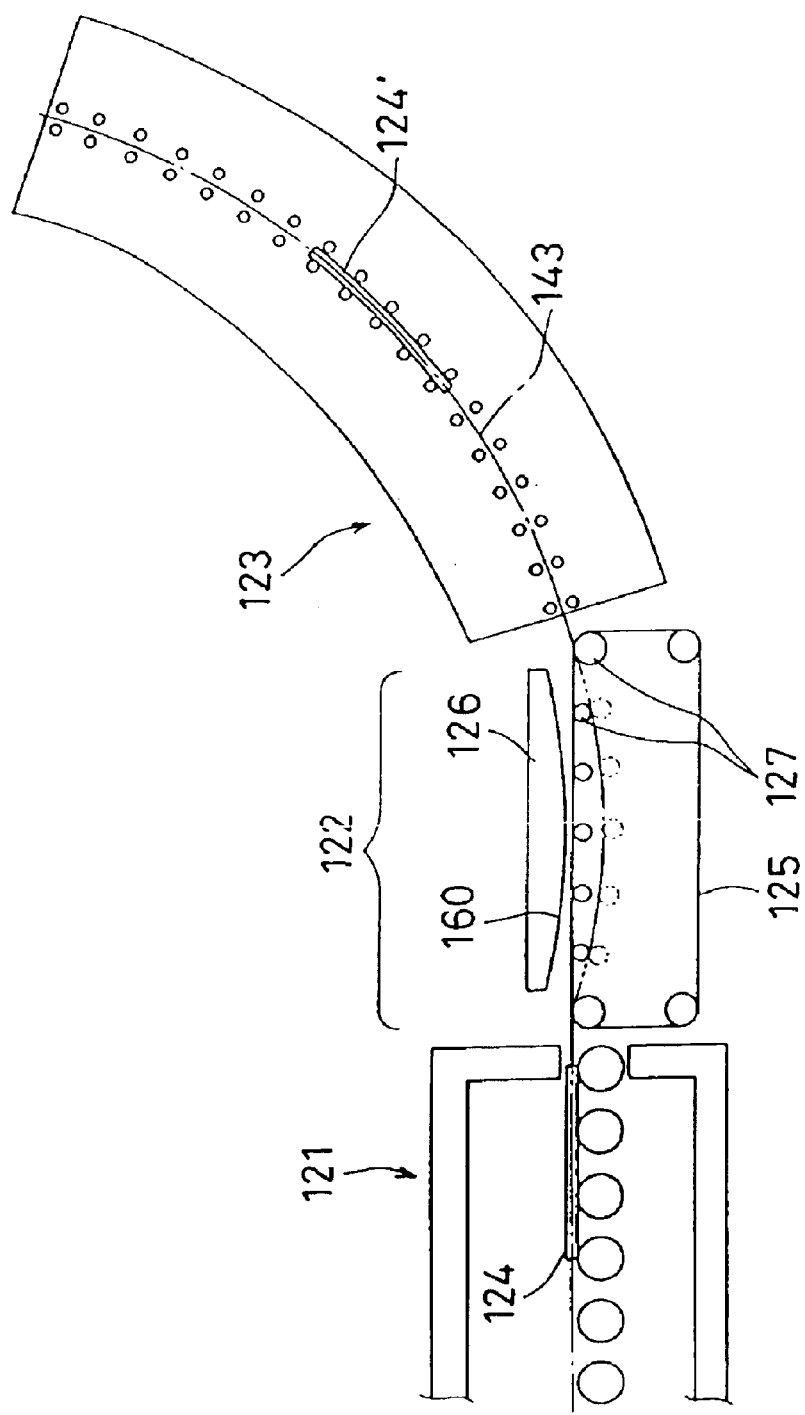
FIG. 23 is a cross-sectional view showing another embodiment of an apparatus for manufacturing a bent glass sheet according to the present invention.

FIG. 23 is a cross-sectional view showing another embodiment of an apparatus for manufacturing a bent glass sheet according to the present invention. As shown in FIG. 23, this apparatus includes a furnace 121, a bending device 122 and a quenching device 123, which have a common conveying passage 143. A glass sheet 124 is heated to a temperature at which the glass sheet becomes shapeable (e.g., to a temperature between the strain point and the softening point of the glass sheet) in the furnace 121, while proceeding on the conveying passage 143. Then, the glass plate is bent in the bending device 122, and quenched for tempering in the quenching device 123.

The conveying passage 143 is set to run in a substantially horizontal direction in the furnace 121, whereas it is set to run so that it forms a curved line having a substantially constant curvature when viewed from the side of the glass sheet conveyance direction in the quenching device 123. Such switching of the conveying passage 143 is performed in the bending device 122. More specifically, the glass sheet 124 is conveyed from the furnace 121 to the bending device 122 in a substantially horizontal direction. Then, after being subjected to the bending process in the bending device 122, in accordance with the change in the shape of the glass sheet, the glass sheet 124 is conveyed from the bending device 122 to the quenching device 123 in the direction along the curved line having a substantially constant curvature. The curvature provided for the conveying passage 143 is set to substantially match the curvature provided for the bent glass sheet 124a with respect to the conveyance direction, so that the glass sheet can be conveyed stably.

A bending member 126 is positioned above the conveying passage 143 in the bending device 122. On the other side, a plurality of rollers 127 are positioned below the conveying passage 143. A belt 125 is suspended in loop-shape by rollers 127, and forms an endless track. Furthermore, at least one roller is connected to a roller driving device (not shown) so that the belt 125 can be driven at a rotational velocity necessary for conveying the glass sheet. Rolls that are not connected to the driving device are preferably non-driven rollers (free rollers), which can rotate with small external force.

Among the surfaces of the bending member, the surface facing the conveying passage 143 functions as a shaping surface 160 for bending glass sheets. As shown in FIG. 23, the shaping surface 160 is provided with a convex shape when viewed from the side of the quenching device in order to provide the glass sheet with a predetermined curvature radius $R_1$ in the conveyance direction. The shaping surface 160 is bent also in the cross direction so as to provide a glass sheet with a predetermined curved line (e.g., a shape having a predetermined curvature radius $R_2$) in the cross direction. As a material for the bending member 126, various metals or ceramics can be used. The bending member 126 can be integrally formed into one piece, as is shown in FIG. 23, or can be formed in combination with a plurality of separate members.

It is preferable to provide the bending member 126 with a heater for the purpose of preventing glass sheets in the early stage of a continuous production from being adversely affected by the bending member 126 whose temperature is not sufficiently raised.

The belt 125 is made of a heat-resistant fiber, such as for example metal fiber, inorganic fiber, graphite fiber, aramid fiber or the like. The heat-resistant material for the heat-resistant belt 125 can be obtained by weaving, twilling, or knitting for example. It is also possible to form heat-resistant material into a felt or a net so as to obtain the heat-resistant belt 125.

The rollers 127 raise the glass sheet 124 together with the belt 125 upwards, so that they act as glass sheet pressing members for pressing the glass sheet against the shaping surface 160 via the belt 125 during the bending process.

Furthermore, the rollers 127 in the bending device 122 facing the conveying passage 143 are positioned in a line in the horizontal direction so that they can support the flat glass sheet 124 via the belt 125 when receiving the glass sheet 124 from the furnace 121. During and after bending the glass sheet 124 on the other hand, the rollers 127 are positioned in accordance with the shape of the surface of the glass sheet, so that the belt 125 presses the glass sheet along the shape of the surface to be formed, or supports the glass sheet stably, and thus the rollers 127 act as belt supporting members. In order to operate the rollers 127 in this manner, a position adjusting mechanism (not shown) is connected to each roller 127, so that the height of each roller 127 can be adjusted in upward and downward directions independently.

A conventional furnace can be used as the furnace 121. There are no particular limitations on a member for conveying a glass sheet in the horizontal direction, but rollers 181 are preferable to convey the glass sheet in view of heating efficiency or the like. Furthermore, basically, a conventional quenching device can be used as the quenching device 123, but it is preferable to use a quenching device provided with a conveying passage that can stably convey a glass sheet having a desired curved shape, as illustrated in FIG. 23.

Next, an example of a process of bending a glass sheet in the bending region with a bending device 122 will be described with reference to FIGS. 24 to 30.

Figure 24:
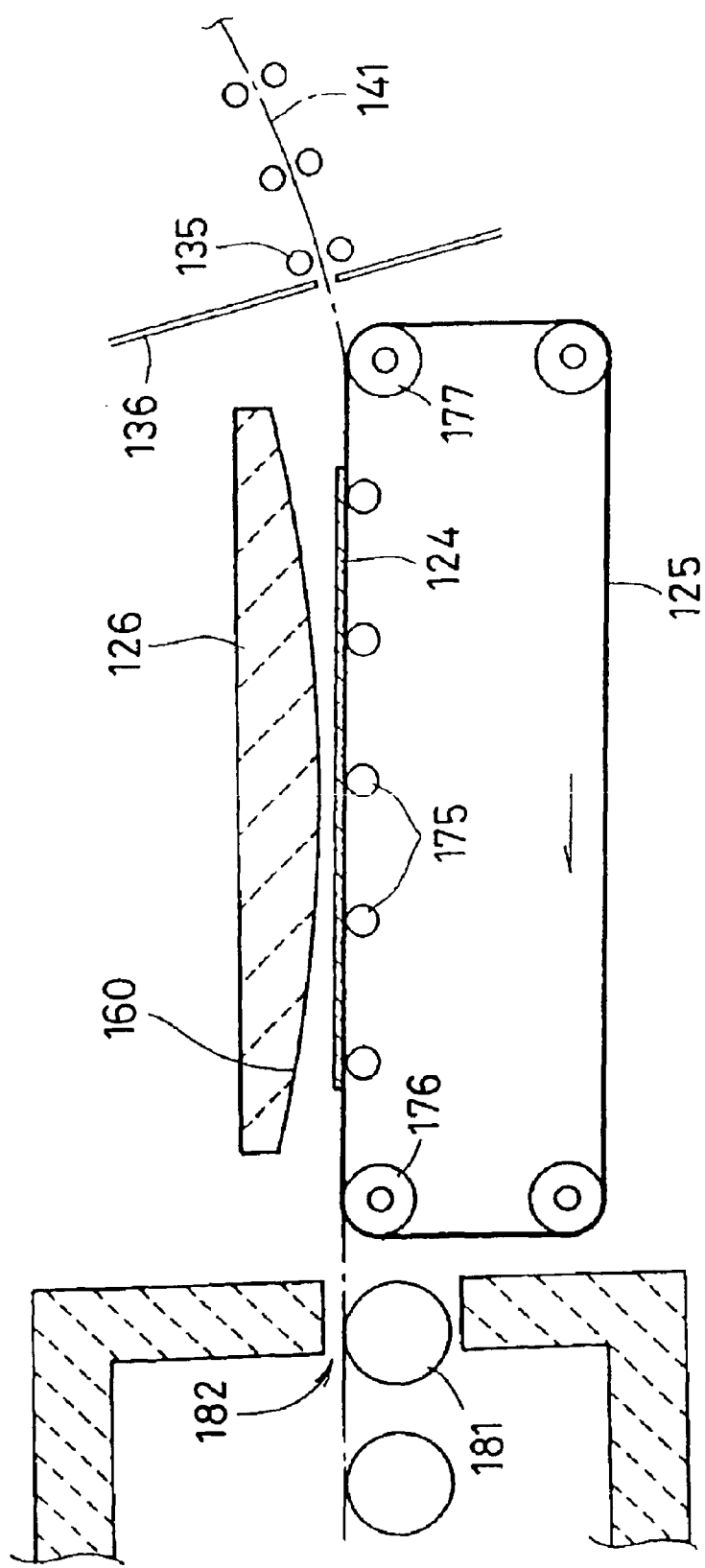
FIG. 24 is a cross-sectional view showing the vicinity of the bending region of the apparatus shown in FIG. 23.

First, the glass sheet 124 is heated to a temperature at which the glass sheet becomes shapeable while being conveyed in the horizontal direction by the rollers 181 in the furnace 121. As shown in FIG. 24, the glass sheet 124 is conveyed from a carry-out opening 182 of the furnace 121 into the bending device 122 by the belt 125.

Figure 25:
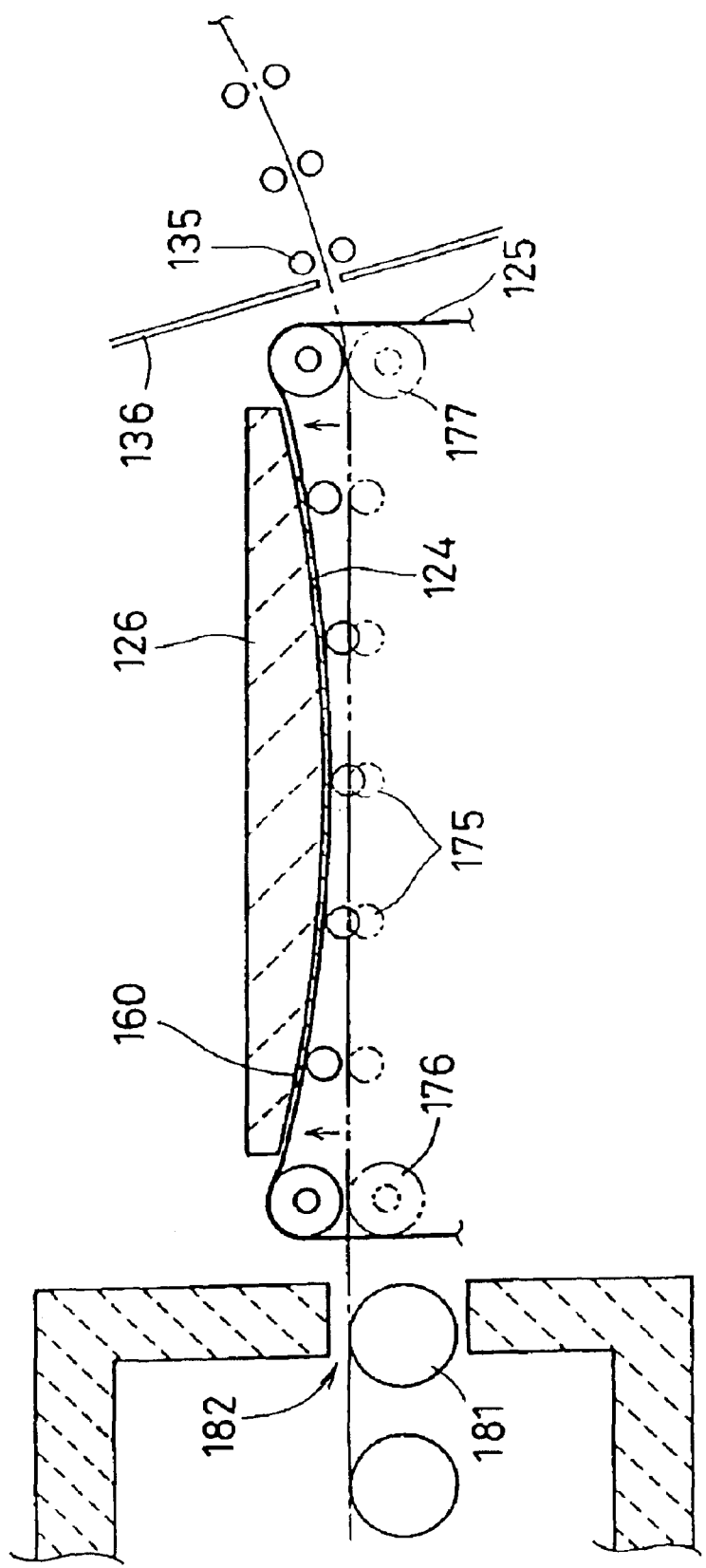
FIG. 25 is a cross-sectional view showing the process of bending a glass sheet in the bending region shown in FIG. 24.

Next, the belt 125 is raised by rollers 175, 176 and 177 for driving the belt, and the glass sheet 124 is sandwiched between the shaping surface 160 of the bending member 126 and the belt 125 so as to be bent, as is shown in FIG. 25. The shape of the shaping surface 160 is imparted to the glass sheet 124. Preferably in the example shown in FIG. 25, the shaping surface 160 is formed in a convex shape with respect to the conveyance direction and has a substantially constant curvature. Among the rollers that raise the belt, the press roller 175 for pressing the glass sheet 124 against the shaping surface 160 is previously set in such a manner that the belt 125 can be raised to a position along the bending surface 160. Furthermore, the end rollers 176 and 177 are lifted to a position at which a suitable tension is retained.

The number of the press rollers 175 can be suitably determined depending on the desired shape of the bent glass sheet, but in general, at least two rollers are necessary. It is preferable to provide at least five rollers.

Figure 26:
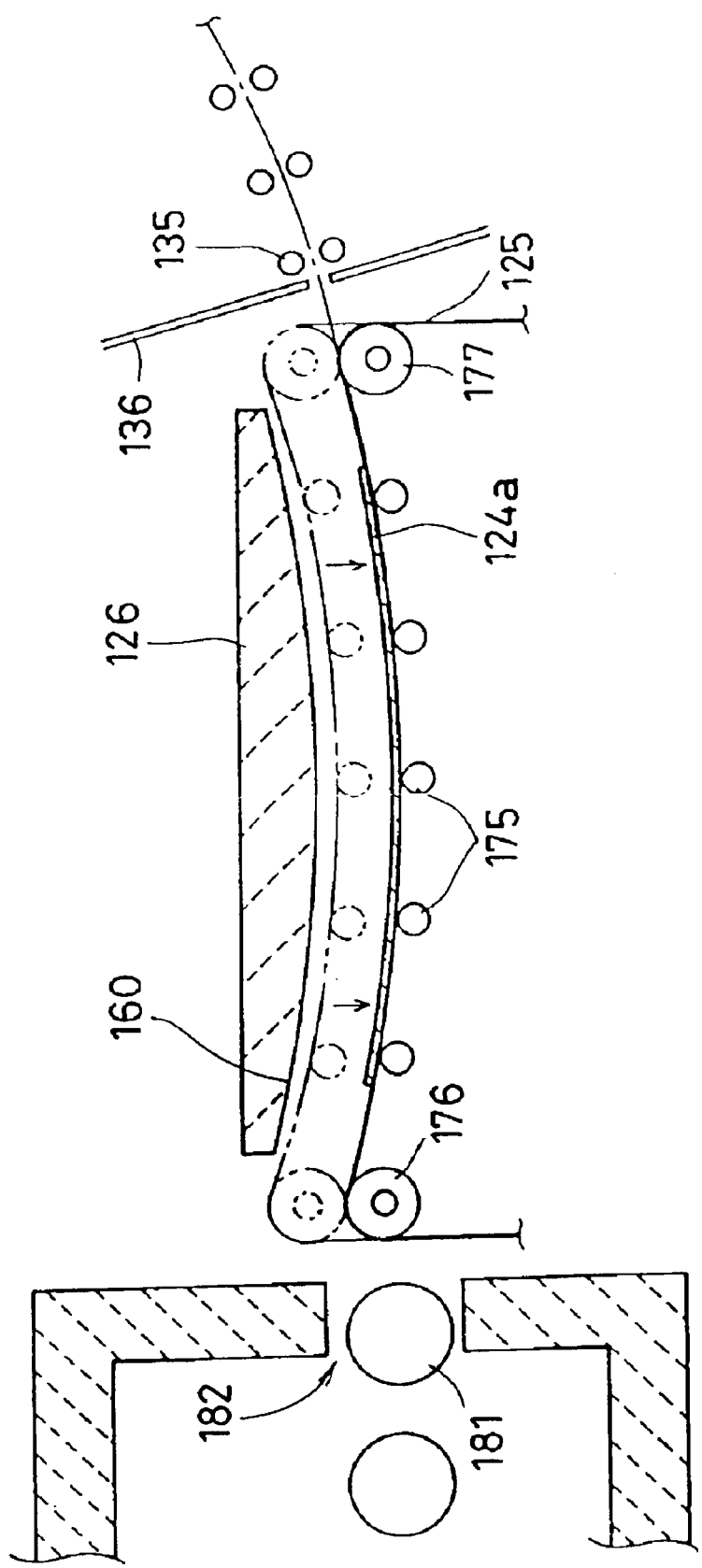
FIG. 26 is a cross-sectional view showing a glass sheet that has been bent in the bending region shown in FIG. 24, and the bent glass sheet has not been conveyed to a quenching device yet.

After bending, as is shown in FIG. 26, the rollers are lowered while maintaining the arrangement having a convex shape with respect to the downward direction. At this time, the glass sheet 124a still has a high temperature. However, the belt 125 is lowered while maintaining the shape along the surface of the bent glass sheet, so that the glass sheet 124 is also lowered while maintaining a stable orientation.

Figure 27:
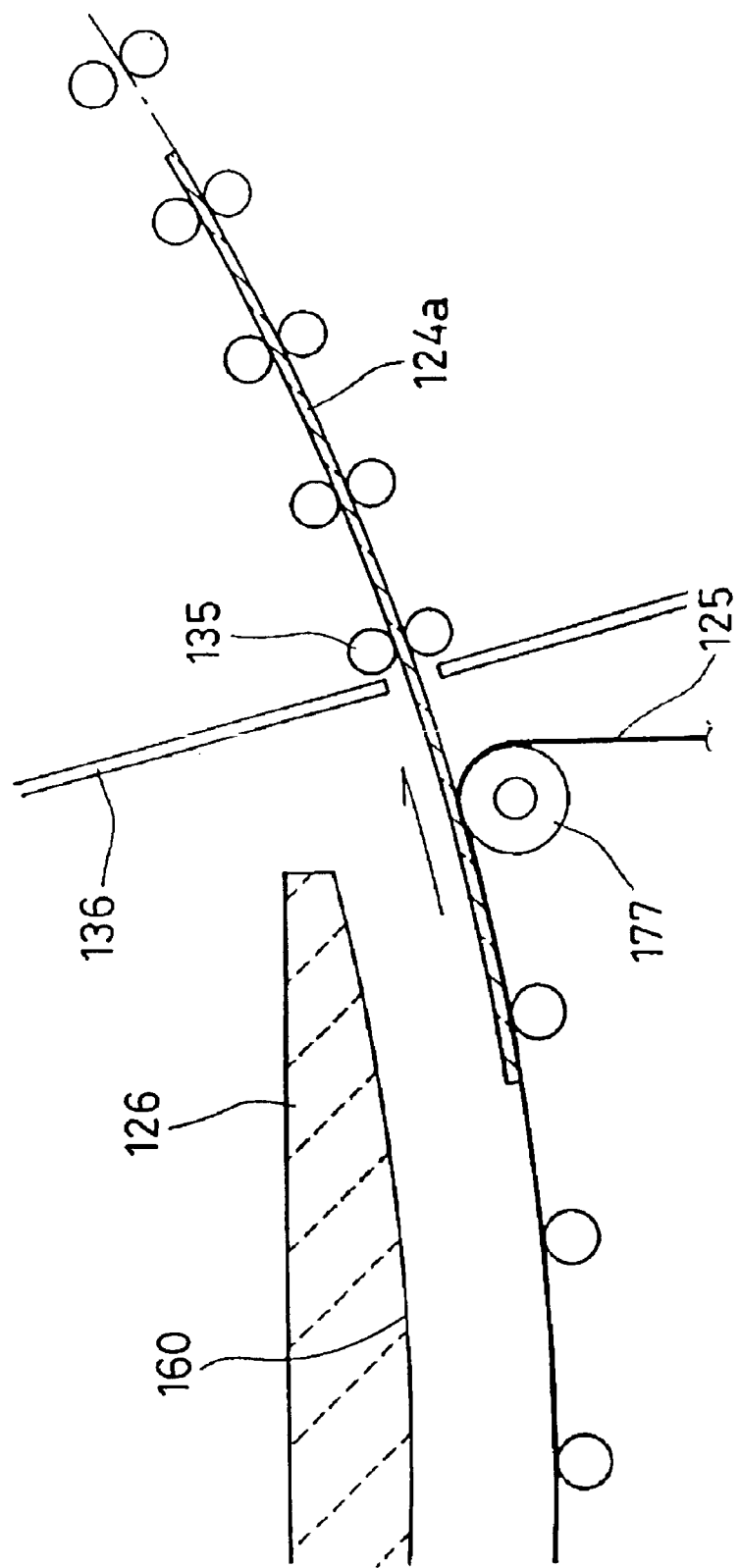
FIG. 27 is a cross-sectional view showing a glass sheet that has been bent in the bending region shown in FIG. 24, and is being conveyed to a quenching device.

As shown in FIG. 26, the glass sheet 124a is lowered to a position from which the glass sheet 124a can be conveyed to the quenching device 123, and preferably a position on the extension of the curved line having a constant curvature formed by the conveying passage 143 in the quenching device 123. At this time, it is necessary to accurately control especially the position of the roller 177 among the rollers. From this position, the bent glass sheet 124a is conveyed by the belt 125 along the surface having a constant curvature, and introduced into the quenching device 123 through a port between boards 136 as shown in FIG. 27. As described above, the direction in which the glass sheet can be conveyed from the bending position to the quenching device 123 is not the horizontal direction, but a direction along the extension of the curved line formed by the cross section of the glass sheet with respect to the conveyance direction. By running the conveying passage 143 of the quenching device 123 in this direction, the glass sheet 124a can be introduced into the quenching device 123 while maintaining a stable orientation.

In the quenching device 123, the glass sheet is quenched by blowing cooled gas from a cooled gas blowing nozzle (not shown) while being conveyed by rollers 135. At this time as well, the glass sheet 124a is preferably conveyed along the direction of the extended curved line. By quenching the glass sheet while being conveyed in such a direction, the glass sheet easily can be conveyed stably and cooled uniformly starting from the surface.

As a result, bent glass sheets having curvature in two directions as shown in FIG. 20 were manufactured continuously.

In the example described above, the rollers 127 function as glass sheet pressing members and belt supporting members. The present invention is not limited thereto, and other embodiments are also possible. For example, a bending member may be prepared below the conveying passage, and this bending member may be used as the glass sheet pressing member. In this case, this bending member can be used also as the belt supporting member. Furthermore, the upper bending member 126 may be lowered so as to press the glass sheet, instead of the glass sheet being raised by rollers 127.

Figure 28:
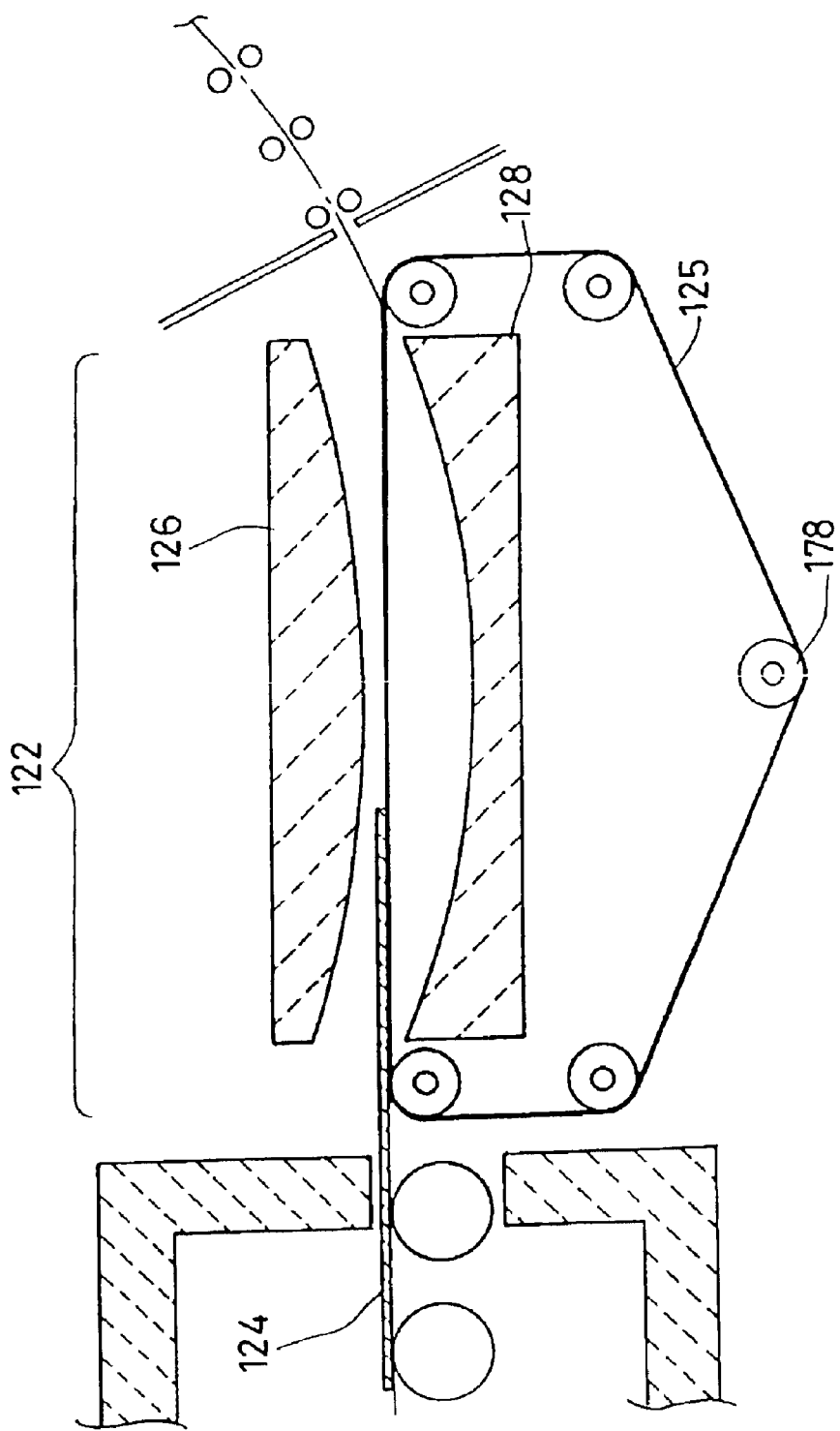
FIG. 28 is a cross-sectional view showing the vicinity of still another embodiment of a bending region of an apparatus for manufacturing a bent glass sheet according to the present invention.
Figure 29:
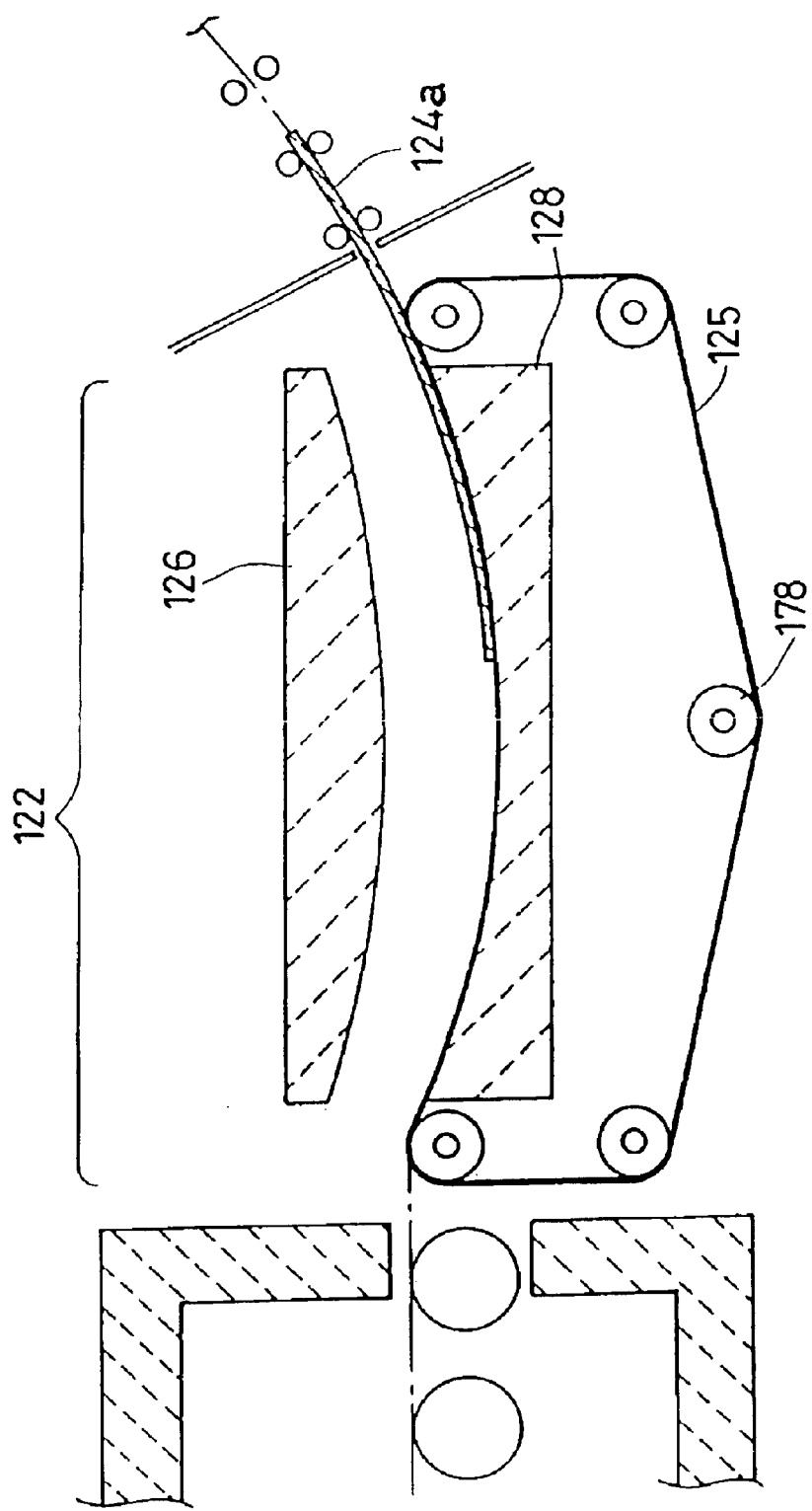
FIG. 29 is a cross-sectional view showing a glass sheet that has been bent in the bending region of the apparatus shown in FIG. 28.

The bending device 122 shown in FIGS. 28 and 29 illustrates such a modified embodiment, where a bending member 128 is used as the belt supporting member. As shown in FIGS. 28 and 29, a bending process in this case is performed by conveying a glass sheet 124 from a furnace 121 to a bending position by a belt 125, lifting a tension roller 178 upward so as to release the tension of the belt 125 while lowering an upper bending member 126 so as to sandwich the glass sheet 124 between the upper bending member 126 and the lower bending member 128. Furthermore, the glass sheet 124a is conveyed to a quenching device 123 by reversing the upper bending member 126 upward and moving the belt 125 bent along the glass sheet 124a while supporting the glass sheet 124a with the belt 125. According to this embodiment including a pair of bending members and a belt tension adjusting mechanism, rollers for forming the shape of the surface of the glass sheet are not required, and an operation of arranging the rollers along the shape of the glass sheet is not necessary in a bending process, thus simplifying the apparatus and the process.

Sixth Embodiment in Manufacturing Method

Figure 30:
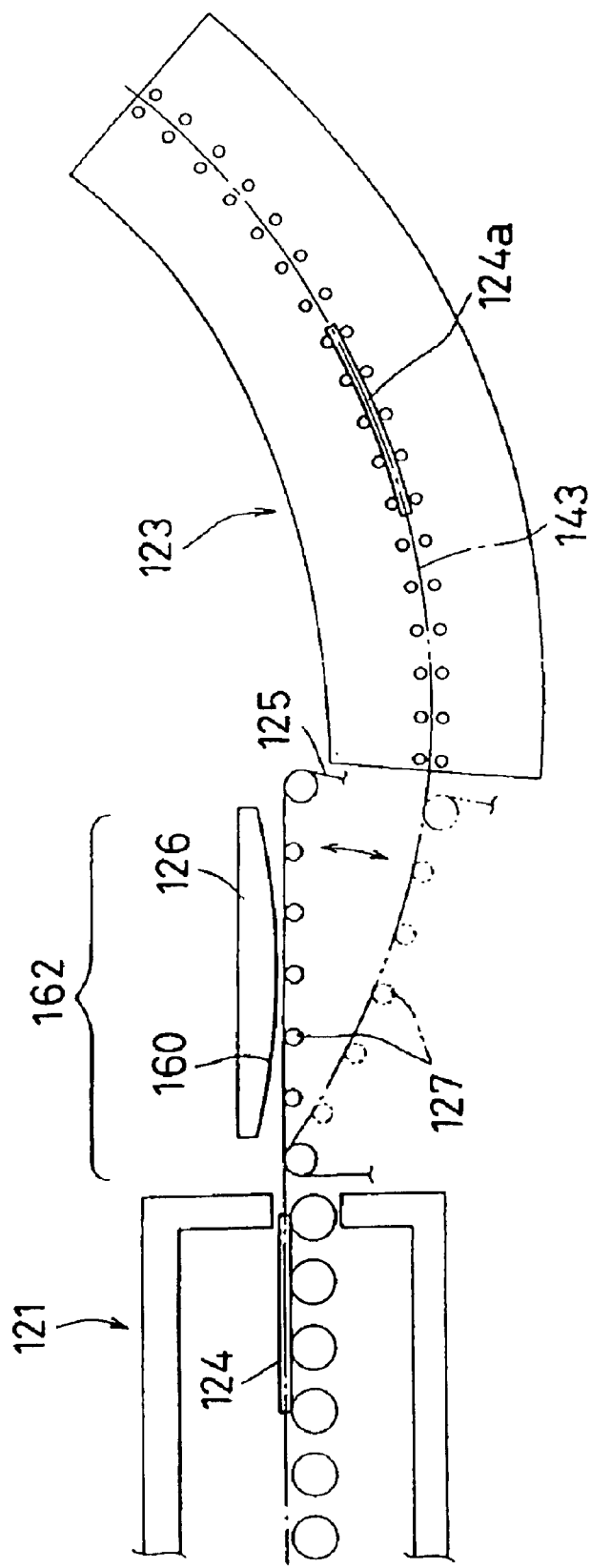
FIG. 30 is a cross-sectional view showing still another embodiment of an apparatus for manufacturing a bent glass sheet according to the present invention.
Figure 31:
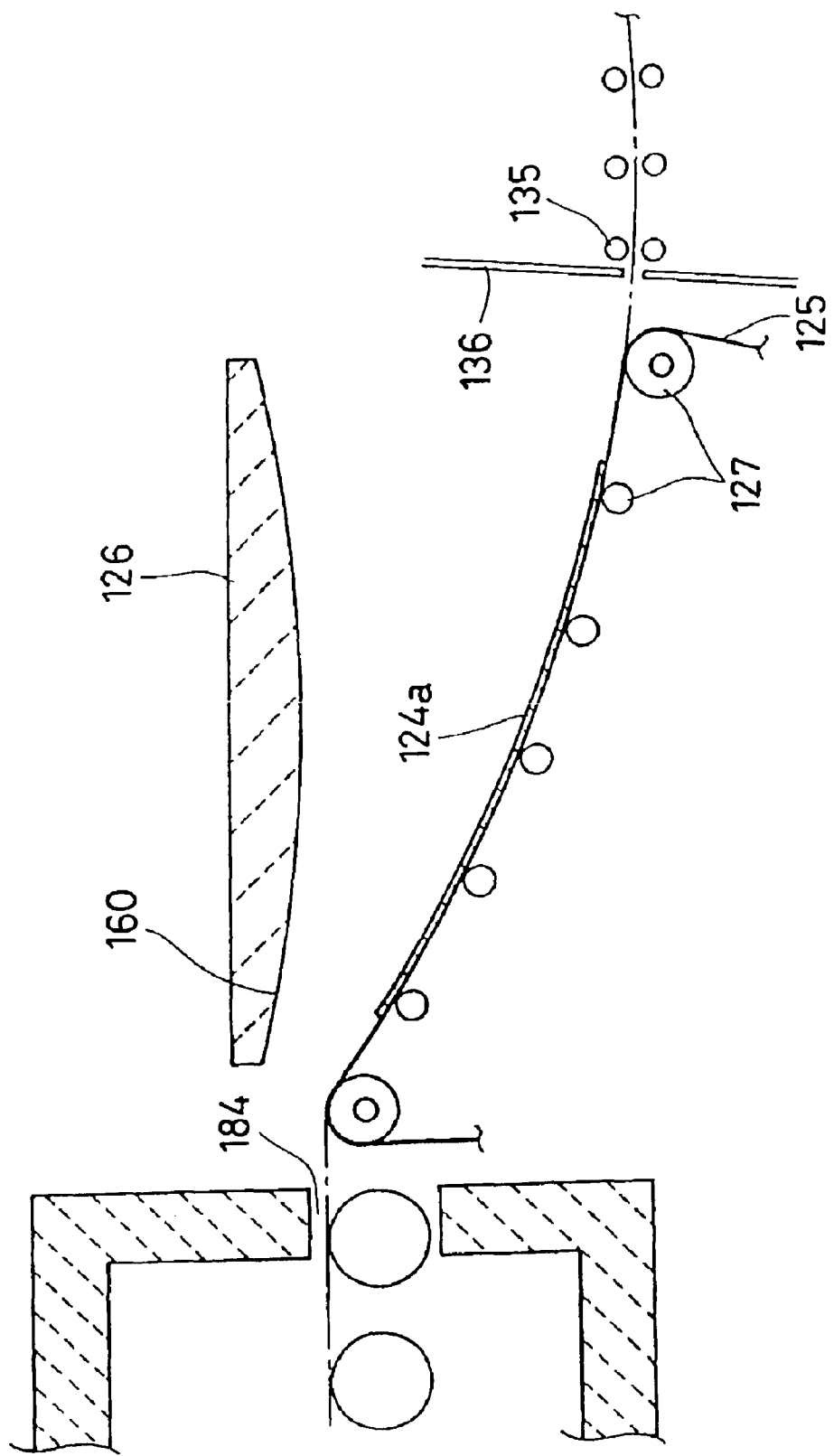
FIG. 31 is a cross-sectional view showing a glass sheet that has been bent in the bending region shown in FIG. 30, and the bent glass sheet has not been conveyed to a quenching device yet.

FIG. 30 is a cross-sectional view showing another embodiment of an apparatus for manufacturing a bent glass sheet according to the present invention. This apparatus has the same structure as the one shown in FIG. 23, except for the position relationship between the bending device 162 and the quenching device 123. This manufacturing apparatus is characterized in that the port of the quenching device (a port between the boards 136) is positioned lower than the carry-out opening 184 of the furnace, as more specifically shown in FIG. 31.

In this embodiment, the bent glass sheet 124*a* changes its orientation before being conveyed to the quenching device 123. The belt 125 supports the bent glass sheet along the curved line of the glass sheet during the orientation change so as to convey the glass sheet to the quenching device.

According to this embodiment, the bent glass sheet 124*a* is carried into the quenching device 123 through the port positioned lower than the position from which the glass sheet 124*a* is introduced to the bending device 162. Therefore, although the belt 125 and the rollers 127 move in a wider range, the glass plate is positioned lower after quenching in the quenching device 123, and the angle of the glass sheet itself is closer to the horizontal direction than in the apparatus shown in FIG. 23. Thus, this lower position provides the advantage of facilitating the handling of the glass sheet in a subsequent process.

In the respective embodiments regarding manufacturing methods, there are no specific limitations for thickness of an available glass sheet. However, according to the embodiments, bent glass sheets having a thickness from 2.3 mm to 5 mm can be manufactured preferably. Moreover, the above-mentioned embodiments are more suitable for manufacturing bent glass sheets that are from 2.3 mm to 3 mm in thickness. The above-mentioned bending method using a belt is characterized also in that even a comparatively thin glass sheet can be bent with high accuracy.

As mentioned above, a bent glass sheet according to the present invention can be manufactured efficiently by:

heating a glass sheet in a furnace to a temperature at which the glass sheet itself becomes changeable in shape;

conveying the glass sheet from the furnace;

pressing the glass sheet together with a belt of a heat-resistant material against a bending member (mold), so that the glass sheet is bent in the glass-conveying direction and also in a direction perpendicular to the glass-conveying direction, and the glass sheet has a predetermined curvature in at least the glass sheet conveying direction; and cooling the bent glass sheet while conveying the same glass sheet on a conveying passage having the above-identified predetermined curvature.

It is preferable in this process that the glass sheet is bent by:

conveying the glass sheet from the furnace in a predetermined (preferably horizontal) direction;

pressing the glass sheet with a belt of a heat-resistant material against a bending member while the glass sheet is conveyed with the belt on a passage that is separated from the predetermined direction as the glass sheet travels downstream, in which the bending member has a surface that is bent gradually in the direction perpendicular to the conveying direction (a direction crossing the conveying passage) as the glass sheet travels downstream.

Preferably in the above-mentioned process, the glass sheet is conveyed to the bending position by a belt of a heat-resistant material supporting the glass sheet. At the bending position, the glass sheet is pressed with the belt against a surface of the bending member so that the glass sheet is bent in the conveying direction and also in the cross direction while the belt is flexed. The glass sheet is conveyed from the bending position by the belt while being supported by the belt that is flexed to be the bending form.

Industrial Applicability of the Invention

As mentioned above, the present invention provides a glass sheet for a vehicle window, and the glass sheet is bent in two directions with accuracy. This glass sheet is not cylindrical or spherical, and it provides reflected images that are smooth and continuous. Such a glass sheet used for a door window serves to smooth opening/closing because of the simple mechanism, and limitations regarding the moving directions is decreased. Considering these effects, the present invention greatly contributes to the technical field relating windows for vehicles.

What is claimed is:

1. A bent glass sheet for a vehicle window, being substantially uniform in thickness and comprising a main surface as a curved surface, the bent glass sheet being obtained by bending a flat glass sheet that is heated to a temperature between a strain point and a softening point of the flat glass sheet, all points on the curved surface having a maximum curvature in a direction of one of two tangent vectors that contact the curved surface and are perpendicular to each other, and having a minimum curvature in the direction of the other of the tangent vectors, wherein all the points have substantially the same maximum curvature;

a curvature at every point on a curved line formed by crossing the curved surface and a flat plane including a normal vector at one point on the curved surface and a tangent vector providing the maximum curvature at the one point is substantially equal to the maximum curvature; and the minimum curvature is neither 0 nor equal to the maximum curvature.

2. The bent glass sheet according to claim 1, wherein a curvature at every point on a curved line formed by crossing the curved surface and the flat plane comprising the normal vector at one point on the curved surface and the tangent vector providing the minimum curvature at the one point is substantially equal to the minimum curvature.

3. The bent glass sheet according to claim 1, wherein the bent glass sheet is tempered by quenching after heating.

4. The bent glass sheet according to claim 1, wherein a curvature radius of the curved line as a group of points having the maximum curvature is no less than 500 mm but less than 5000 mm.

5. The bent glass sheet according to claim 2, wherein a curvature radius of the curved line as a group of points having the minimum curvature is from 5000 mm to 50000 mm.

6. The bent glass sheet according to claim 1, wherein the bent glass sheet is obtained by:

heating a glass sheet to a temperature at which the glass sheet becomes shapeable in a furnace;

conveying the glass sheet from the furnace;

pressing the glass sheet together with a belt of a heat-resistant material against a bending member so that the glass sheet is bent in the conveying direction of the glass sheet and also in a direction perpendicular to the conveying direction and the glass sheet has a predetermined curvature in at least the conveying direction; and cooling the bent glass sheet while the glass sheet is conveyed further on the conveying passage having the predetermined curvature.

7. A bent glass sheet for a vehicle window, the bent glass sheet being uniform in thickness and comprising a main surface as a curved surface, the bent glass sheet being obtained by bending a flat glass sheet that is heated to a temperature between a strain point and a softening point of the flat glass sheet, the main surface being a part of a curved surface formed by a parallel translation of a first curved line that is on a predetermined flat plane and convex in one direction, wherein in the parallel translation the first curved line is translated out of the flat plane so that loci of all points composing the first curved line describe a group of second curved lines having a predetermined radius of curvature, and the second curved lines are substantially parallel to each other and substantially identical in length.

8. The bent glass sheet according to claim 7, wherein the first curved line has a first curvature radius, and the first curvature radius is greater than a second curvature radius that the second curved line has.

9. The bent glass sheet according to claim 8, wherein the first curvature radius ranges from 5000 mm to 50000 mm and the second curvature radius is no less than 500 mm but less than 5000 mm.

* * * * *